(12) United States Patent
Li et al.

(10) Patent No.: US 9,913,151 B2
(45) Date of Patent: Mar. 6, 2018

(54) SYSTEM AND METHOD FOR MODIFYING A SERVICE-SPECIFIC DATA PLANE CONFIGURATION

(71) Applicant: Huawei Technologies Co., Ltd., Shenzhen (CN)

(72) Inventors: Xu Li, Nepean (CA); Jaya Rao, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 146 days.

(21) Appl. No.: 14/948,035

(22) Filed: Nov. 20, 2015

(65) Prior Publication Data

US 2016/0150421 A1 May 26, 2016

Related U.S. Application Data

(60) Provisional application No. 62/083,033, filed on Nov. 21, 2014.

(51) Int. Cl.
*H04W 24/02* (2009.01)
*H04W 4/00* (2018.01)
(Continued)

(52) U.S. Cl.
CPC ......... *H04W 24/02* (2013.01); *H04L 41/0803* (2013.01); *H04L 43/08* (2013.01);
(Continued)

(58) Field of Classification Search
CPC .............................. H04W 24/02; H04W 4/005
See application file for complete search history.

(56) References Cited

U.S. PATENT DOCUMENTS 8,650,294 B2 * 2/2014 Thyni ................. G06Q 50/188
709/220
2006/0187836 A1 8/2006 Frey et al.
(Continued)

FOREIGN PATENT DOCUMENTS

| CN | 101203038 A | 6/2008 |
|---|---|---|
| WO | 2009154414 A2 | 12/2009 |

OTHER PUBLICATIONS

Rewagad, P., et al. "Significance of Virtual Backbone in Wireless Ad-Hoc Network.", International Journal of Scientific & Technology Research, vol. 2, Issue 1, Jan. 2013, p. 82-85.
(Continued)

*Primary Examiner* — Min Jung
(74) *Attorney, Agent, or Firm* — Slater Matsil, LLP

(57) ABSTRACT

A method for network adaptation includes receiving, by an adaptation coordinator of a virtual network, a performance measurement generated at a performance checkpoint located in the virtual network. The method also includes generating, by the adaptation coordinator, a first update of a service-specific configuration of the virtual network. The first update includes at least one of a modification of a performance checkpoint configuration, a modification of a Virtual Network Function (VNF) configuration, a modification of a protocol configuration, a modification of a resource allocation input, or a modification of a logical graph. The service-specific configuration includes a configuration of a plurality of logical nodes and a plurality of logical links of the virtual network in accordance with a service-specific data plane logical topology.

26 Claims, 18 Drawing Sheets

(51) Int. Cl.
  *H04L 12/26* (2006.01)
  *H04L 12/24* (2006.01)
  *H04W 28/18* (2009.01)
  *H04W 28/02* (2009.01)
  *H04L 12/801* (2013.01)

(52) U.S. Cl.
  CPC ......... *H04W 4/005* (2013.01); *H04L 43/0852* (2013.01); *H04L 43/0888* (2013.01); *H04L 47/12* (2013.01); *H04W 28/0289* (2013.01); *H04W 28/18* (2013.01); *Y04S 40/162* (2013.01); *Y04S 40/168* (2013.01)

(56) References Cited

U.S. PATENT DOCUMENTS

| | | |
|---|---|---|
| 2008/0313255 A1 | 12/2008 | Geltner et al. |
| 2010/0220622 A1 | 9/2010 | Wei |
| 2011/0110236 A1 | 5/2011 | Kadambi et al. |
| 2013/0297729 A1* | 11/2013 | Suni ........................ H04L 67/10 709/217 |
| 2014/0075506 A1* | 3/2014 | Davis ...................... H04L 67/12 726/3 |
| 2014/0280834 A1 | 9/2014 | Medved et al. |
| 2014/0280900 A1 | 9/2014 | McDowall |
| 2014/0307556 A1 | 10/2014 | Zhang |
| 2014/0321376 A1 | 10/2014 | Damnjanovic et al. |
| 2015/0074259 A1* | 3/2015 | Ansari .................... H04L 67/02 709/224 |
| 2015/0326448 A1* | 11/2015 | Chaudhary ............ G06Q 20/14 705/40 |
| 2015/0326535 A1* | 11/2015 | Rao ...................... H04L 41/5054 726/15 |
| 2016/0006753 A1* | 1/2016 | McDaid .............. H04L 63/1425 726/23 |
| 2016/0078342 A1* | 3/2016 | Tang ....................... H04L 41/00 706/47 |

OTHER PUBLICATIONS

"Network Functionis Virtualisation (NFV); Virtual Network Functions Architecture," Draft ETSI GS NFV-SWA 001 V0.2.4, Nov. 2014, 94 pages.

\* cited by examiner

SYSTEM AND METHOD FOR MODIFYING A SERVICE-SPECIFIC DATA PLANE CONFIGURATION

This application claims the benefit of U.S. Provisional Application No. 62/083,033, filed on Nov. 21, 2014, which application is hereby incorporated herein by reference.

TECHNICAL FIELD

The present invention relates generally to a system and method for modifying a data plane configuration, and, in particular embodiments, to a system and method for modify a service-specific data plane configuration.

BACKGROUND

Telecommunications networks are constantly evolving to improve revenue generation by incorporating new technologies with improved features and functionality for delivering higher data rates and quality of service, while attempting to maintain or increase cost efficiencies. Thus, network operators have been considering a wide variety of new revenue-generating services, including machine-to-machine (M2M) long-term monitoring and control services. M2M services may include, e.g., traffic monitoring, fleet management, smart metering, environmental monitoring, industrial monitoring and control, etc. The number of M2M devices is expected to grow quickly as more connected device become available to consumers, and as more industries adopt M2M technologies such as sensor networks.

SUMMARY

In accordance with a first example embodiment of the present invention a method for network adaptation is provided. The method includes receiving, by an adaptation coordinator of a virtual network, a performance measurement generated at a performance checkpoint located in a the virtual network. The method also includes generating, by the adaptation coordinator, a first update of a service-specific configuration of the virtual network. The first update includes at least one of a modification of a performance checkpoint configuration, a modification of a Virtual Network Function (VNF) configuration, a modification of a protocol configuration, a modification of a resource allocation input, or a modification of a logical graph. The service-specific configuration includes a configuration of a plurality of logical nodes and a plurality of logical links of the virtual network in accordance with a service-specific data plane logical topology.

In accordance with a second example embodiment of the present invention, a method for network adaptation is provided. The method includes receiving a performance measurement generated at a performance checkpoint located in a virtual network. The method also includes modifying a service-specific configuration of the virtual network in accordance with the performance measurement during a first configuration update that does not include modifying a logical graph of the virtual network. The modifying the service-specific configuration includes at least one of modifying a performance checkpoint configuration, modifying a VNF configuration, modifying a protocol configuration, or modifying a resource allocation input. The service-specific configuration includes a configuration of a plurality of logical nodes and a plurality of logical links of the virtual network.

In accordance with a third example embodiment of the present invention, an adaptation coordinator is provided. The adaptation coordinator includes a processor and a non-transitory computer readable storage medium storing programming for execution by the processor. The programming includes instructions to receive a performance measurement generated at a performance checkpoint located in a virtual network and generate a first update of a service-specific configuration of the virtual network. The first update includes at least one of a modification of a performance checkpoint configuration, a modification of a VNF configuration, a modification of a protocol configuration, a modification of a resource allocation input, or a modification of a logical graph. The service-specific configuration includes a configuration of a plurality of logical nodes of the virtual network and a plurality of logical links of the virtual network in accordance with a service-specific data plane logical topology.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
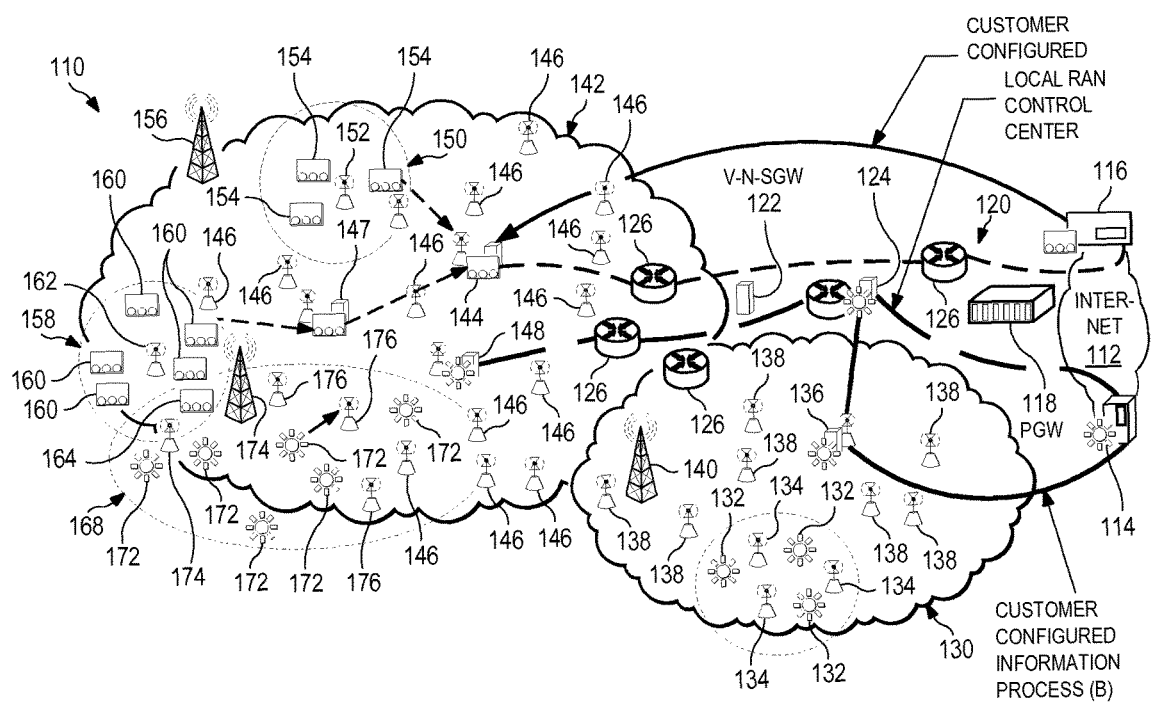
FIG. 1 is a block diagram illustrating a network for an information-centric customized virtual network architecture supporting M2M transactions, in accordance with embodiments of the present invention.

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In various embodiments, a network of wired and/or wireless nodes uses a Network Function Virtualization (NFV) Infrastructure (NFVI). By using an NFVI, network functions can be instantiated at a variety of different locations where underlying hardware infrastructure is available. Network functions can be placed where they are needed, when they are needed, and can then be either taken down or moved according to the needs of the network. The Virtual Network Functions (VNFs) that may be supported by the NFV infrastructure may include, for example, functions for flow control (e.g., including ordering and rate matching), reliability (e.g., including data loss identification, data loss indication, and data recovery), security (e.g., including end-to-end or network security), data forwarding, out-of-order control (e.g., including packet sequence numbers), fragmentation/reassembly, compression, congestion, error control, named content delivery (e.g., including content interest storage, content holder identification, content data blocks caching, content identification and content security verification), data aggregation (e.g., reverse multicast aggregation), data holding (e.g., delay-tolerant networking functions and retransmissions), and other functions. Some VNFs that are instantiated on end or edge nodes may perform functions that are end-to-end functions in a path across the network. Some VNFs for performing, e.g., a reliability function, may be instantiated, in a link connecting a pair of nodes and/or in multiple-links over many nodes along a network path. Further, some VNFs may be configured to work at different levels of complexity or increased functionality (e.g., security function). The use of VNFs is one example of virtualization, which provides the ability to elastically support the functional demands of a network by allowing the functions that were formerly discrete hardware resources to be virtualized, i.e., defined in software, on an underlying pool of physical resources. For example, a VNF may be virtualized as a single resource entity even when the underlying hardware resources supporting the VNF are not all physically co-located or only include a portion of the component resources of individual physical devices.

Various embodiments include one such software defined entity referred to in this disclosure as a virtual network, which is a collection of virtualized resources used to support a particular service, such as, for example, an M2M service. In various embodiments, M2M traffic is dominated by a star-like uplink communication pattern, where a large number of machines (traffic sources) report to a smaller number of traffic sinks. M2M communication may take place in different modes, such as a pull mode in which the sink queries the sources, and a push mode in which the sources proactively send their data to the sinks. Push mode can be time-driven or event-driven.

In various embodiments, a virtual network may use an NFV controller that instantiates VNFs in an M2M network to perform, for example, data processing functions and traffic control functions. Traffic control VNFs can include traffic shaping, traffic prioritization, and packet aggregation VNFs. Data processing VNFs include VNFs that operate at the application layer. Application layer VNFs can provide in-network processing of M2M communications. By processing communications in the network, it may be possible to reduce the bandwidth consumed by transmitting raw data to an M2M application server. By reducing the amount of data transmitted, or by pre-processing the data, it may also be possible to reduce the energy consumed in transmitting the data and processing it at an M2M application server. Data processing VNFs may be instantiated as a single virtual node that handles all the processing, or they can be instantiated across a number of different points of presence (POPs). Those skilled in the art will appreciate that it may be beneficial to instantiate VNFs at pre-defined aggregation points. The placement of VNFs can be done opportunistically taking advantage of processing abilities at different POPs in the underlying network, or it can be done deterministically by reserving capacity at identified data centers. Other data processing VNFs may include, for example, encryption functions and filtering functions. Filtering VNFs may include, for example, VNFs for computing the average or finding maximum temperature in environmental monitoring applications, etc.

In various embodiments, a virtual network may use Software Defined Resource Allocation (SDRA) functions that adjust the configuration of how physical resources are allocated to support network services. SDRA functions include Traffic Engineering (TE) optimization for wired and/or wireless network nodes to determine the paths and/or nodes in the data plane that should be selected for handling a service, traffic flow, or a virtual sub-network. SDRA functions may also include functions for computing radio access results.

In various embodiments, a virtual network may use Software-Defined Networking (SDN) to abstract the underlying network infrastructure from the application and to decouple the network data plane and network control plane. The control plane is a system for making decisions about where traffic should be sent and for transporting control signals among the various network nodes and User Equipments (UEs). The data plane is a system for transporting network traffic among the various network nodes and UEs.

In various embodiments that use an NFVI, logical nodes may be defined in the data plane. A logical node is a virtual entity that is implemented at one or multiple physical network nodes. A logical node can host VNFs, and perform a variety of roles. A logical node may perform the role of, for example, a virtual user-specific serving gateway (v-u-SGW), a virtual service-specific serving gateway (v-s-SGW), or a content container, among other roles. A v-s-SGW is a logical node that is defined based on a specific service it supports, and which only supports that particular service. A v-s-SGW may be configured to process application layer data. The processing performed by a v-s-SGW defined for an M2M service can be customized to the particular needs of the M2M service. M2M traffic is gathered at the v-s-SGWs and then forwarded to the final destination(s) over logical links. The M2M traffic may be processed at the v-s-SGWs using a data aggregation VNF. In some embodiments, the location of this data aggregation VNF may be pre-determined and fixed. Each M2M service supported by the network may be associated with multiple v-s-SGWs, and the v-s-SGWs of multiple services may be physically co-located.

In various embodiments, a virtual network supporting M2M services also uses Software Defined Protocol (SDP) for the protocol stacks of the logical nodes of the data plane. In this disclosure, a protocol stack refers to the set of protocols that are enabled at a node and the order in which the node executes them. SDP provides a way of customizing the protocol stacks of individual network nodes. In an SDP-enabled node, protocols are implemented in software so that protocols can be added, changed, or removed without replacing the node, and so that existing protocols may be enabled, disabled, or reordered in the node's protocol stack. For example, adjusting a node's SDP configuration may include skipping protocols of a complex protocol stack to reduce traffic congestion at the node.

In various embodiments, to manage the complexity of a data plane that allows more protocol options, the SDP-enabled network nodes may be controlled by an external SDP controller that selects a protocol stack that is suitable to accomplish a required Quality of Service (QoS). In embodiments where the network includes an NFVI and SDP-enabled logical nodes, the SDP controller may modify the protocol stack of the logical nodes in accordance with support required by the VNFs that are to be instantiated at the logical nodes.

U.S. patent application Ser. No. 13/952,489, entitled "System and Method for Providing a Software Defined Protocol Stack," filed on Jul. 26, 2013, and U.S. patent application Ser. No. 14/160,146, entitled "System and Method for a Software Defined Protocol Network Node," filed on Jan. 21, 2014, both of which are hereby incorporated herein by reference, provide further detailed description of SDP and functional customization of logical nodes that may be utilized by embodiments disclosed herein.

In various embodiments, a virtual network supporting M2M services also uses Software Defined Topology (SDT) that is controlled by an SDT controller in the control plane. SDT provides a framework for software defined data communications that allows operators to define a data plane architecture that is, for example, on-demand and service specific, to enable more efficient use of network resources and ensure QoS and Quality of Experience (QoE) to customers. The SDT controller may allow the data plane architecture to be managed by, for example, network providers, virtual network providers, or customers. Customers may include users of applications, services, or virtual sub-networks via a UE, terminal, or other customer device. Providers may include service providers, virtual network operators, and other providers of services over the network.

U.S. Non-Provisional patent application Ser. No. 14/796,475, filed on Jul. 10, 2015, entitled "System and Method for Information Centric Network Resource Allocation," which is hereby incorporated herein by reference, discloses a system and method for dynamically allocating resources which may support a just in time expandability for the management of M2M communication. The system and method include an SDT controller receiving a report from a first virtual gateway of a plurality of virtual gateways in a data plane, and updating customer specific service parameters in accordance with the report. The method also includes updating a data plane logical topology of the data plane in accordance with the report, where updating the data plane logical topology includes at least one of adding a virtual gateway to the plurality of virtual gateways, removing a virtual gateway of the plurality of virtual gateways, modifying a capacity of a virtual gateway of the plurality of virtual gateways, and/or modifying a location of a virtual gateway of the plurality of virtual gateways, to produce an updated data plane logical topology.

In various embodiments where SDT is combined with SDRA and NFV, a customized virtual network is created that includes a virtual backbone of "tunnels," i.e., logical links defined by the SDT controller, which connect logical nodes to each other. Before the logical links are formed, the SDT controller logically maps a set of service level logical topologies (i.e., topological descriptions of which VNFs and hardware resources are needed to support various services) to the data plane to create a data plane logical topology. When combined with the physical network resource locations, this data plane logical topology determines where logical nodes are going to be located, and the determination of where nodes are located defines the physical links that can be logically grouped together to form a logical link. For support of a particular service by the virtual network, the SDT controller may determine an on-demand and customized Service-Specific Data Plane Logical Topology (SSD-PLT).

When creating or customizing the virtual network architecture for M2M services, the SDT control procedure includes updates of the virtual network architecture that are performed in accordance with a feedback loop to the customer. This type of routinely performed, customer-driven adaptation does not normally happen in real time, however, but instead normally occurs at the end of a lengthy SDT update cycle due to the customer's large operational delay. For example, the customer may need to go through a lengthy decision-making process in order to adjust its business logic/service request (e.g., machine transmission schedule, service/traffic quality requirements, in-network data processing VNFs, function chaining, etc.). The network, however, may accommodate multiple services with diverse traffic characteristics in different service-specific slices of the data plane.

In various embodiments, since this service-specific traffic may change rapidly in terms of rate (e.g., average rate, peak rate, rate variation, etc.), real-time adaptation is performed to improve efficiency from the perspective of resource utilization by the NFV infrastructure relative to maintaining previously instantiated SSDPLTs in a static configuration between routinely performed SDT updates. Such real-time adaptation may prevent inefficient resource utilization that would be due to the transient nature of service traffic and could otherwise manifest itself in the form of, for example, network traffic congestion.

In various embodiments, a network that supports a wide variety of services (including M2M services) uses a combination of SDT, SDP and SDRA technologies, which are collectively referred to as Service-Oriented Network Auto-Creation (SONAC)-enabling technologies or SONAC technologies. In this disclosure, the term "SONAC-capable" refers to a network is equipped with SONAC technologies, and the term "SONAC-defined" refers to a virtual network that is created through SONAC technologies.

In various embodiments, a SONAC-capable network is supported by an entity located in the control plane that is referred to as a SONAC coordinator. The SONAC coordinator uses information and requirements from customers and/or providers to determine an initial network configuration when service is instantiated or updated during a routinely performed SDT update. This initial network configuration includes initial SDT input parameters, and may also include input parameters associated with SDP and SDRA. The SONAC coordinator can also support the SDT controller to allow adaptation of the SONAC-defined virtual network during network-driven updates that occur between routinely performed SDT updates. Such network-driven updates may address transient dynamics in the network, such as, for example, congestion that was not anticipated during the routinely performed SDT update process.

In various embodiments, the routinely performed SDT updates are SONAC updates that allow for a full range of "SONAC adaptation" that includes supporting a particular service by adjusting the optimization inputs for forming an SSDPLT of the SONAC-defined virtual network (referred to in this disclosure as "adapting per service SDT configuration"), and supporting a particular service by adjusting the SDP configuration and/or the SDRA/TE configuration of how physical resources are allocated in the data plane (referred to in this disclosure as "adapting per service SDT provisioning configuration"). For example, adapting per service SDT configuration during routinely performed SONAC updates may allow for changes to the logical graph of the SSDPLT to adapt to changes in, e.g., traffic load and traffic load predictions, network node capabilities, and mobility of customer devices. The logical graph includes a configuration of which physical nodes are used as Points of Presence (PoPs) hosting the logical nodes, how much data processing capacity (i.e., computing resources) is provided at each of these logical nodes, how many logical nodes are in the data plane, how many logical links are in the data plane, and to which logical nodes these logical links are connected. Unlike the routinely performed SONAC updates, only a subset of the network-driven updates will require adjusting the logical graph, while the remainder of these network-driven updates will allow faster reconfiguration of the network by performing a more limited SONAC adaptation that may include, for example, adding, enabling, disabling, or removing some of the VNFs of existing logical nodes without modifying the logical graph. SONAC adaptation during network-driven updates may also include adapting per service SDT provisioning configuration, such as, for example, modifying the SDRA/TE input parameters of one or more logical links between the logical nodes, modifying the protocol configuration over one or more logical links, etc. Modifying the protocol configuration over a logical link may include, for example, installing, enabling, removing, disabling, modifying, or reordering protocols of SDP-enabled physical network node(s) supporting the logical link.

FIG. 1 illustrates network 110, which supports an information-centric customized virtual network architecture supporting M2M transactions. Processing VNFs, such as monitoring and aggregation VNFs, may be instantiated close to the network edge in logical nodes or nodes which are configured to process application layer data, which is customized to the M2M service. There are two M2M customers in network 110, M2M service 116 for customer A, a health service, for example emergency service to provide first aid, and M2M service 114 for customer B, a temporary service. In other examples, more or fewer customers may be present in a network. Different services for different customers may be co-located.

Public data network (PDN) gateway (PGW) 118 provides an interface between internet 112 and network 120. Network 120 contains virtual network serving gateway (v-n-SGW) 122. The v-n-SGW is a common logical node shared by all services. Also, network 120 contains service-specific v-s-SGW 124 and serving gateways 126.

A customer configured process which is customized for customer B is performed in Customer Configured Information Process (CCIP) node 136 in customer B region 130. Customer B network devices 138 and base station 140 process customer B information. For example, area 130 contains customer B network devices 134 and customer B M2M devices 132. As used herein, the term "base station" refers to any component (or collection of components) configured to provide wireless access to a network, such as an enhanced base station (eNB), a macro-cell, a femtocell, a Wi-Fi access point (AP), a wireless network AP which may be a combination of a transmit point (TP) and receive point (RP), or other wirelessly enabled network node. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. or successor technologies that are not yet standardized. As used herein, the term "network device" refers to mobile devices and various other wireless devices, such as relays, low power nodes, etc. As used herein, the term "mobile device" refers to any component (or collection of components) capable of establishing a wireless connection with a base station, such as a user equipment (UE), a mobile station (STA), and other wirelessly enabled devices.

Figure 2A:
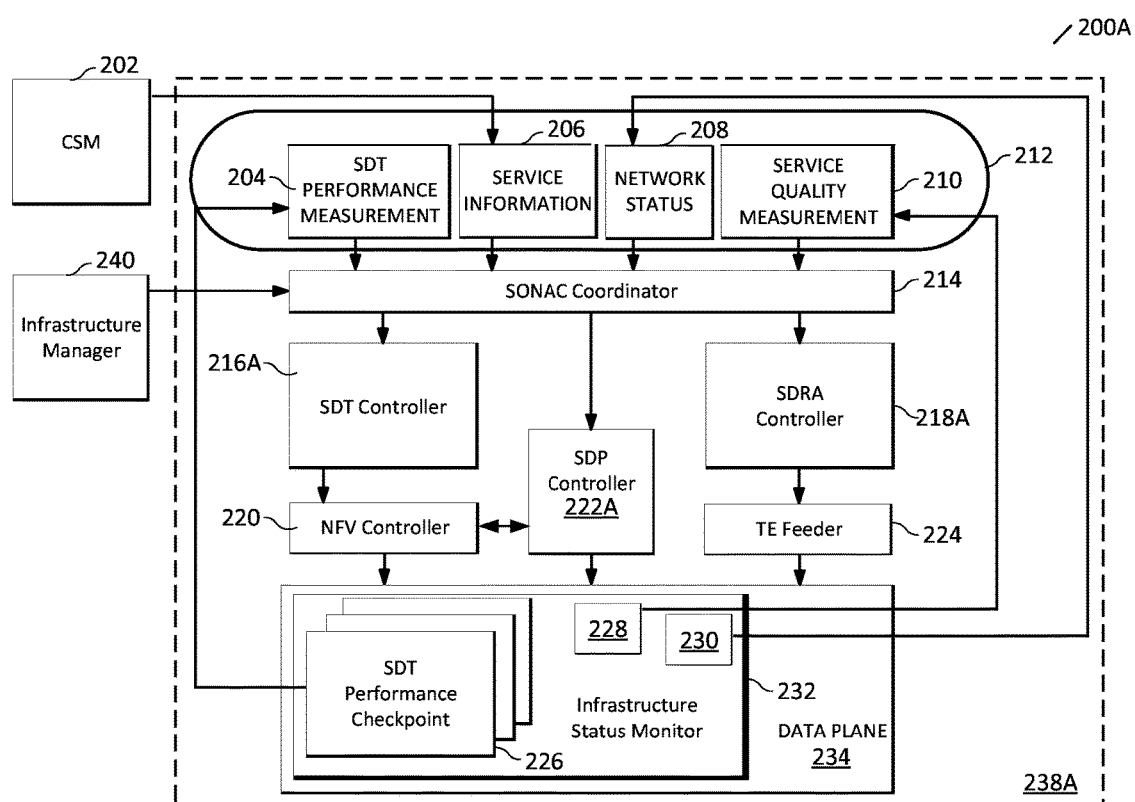
FIG. 2A is a block diagram illustrating a network that is capable of Service-Oriented Network Auto-Creation (SONAC), in accordance with embodiments of the present invention.

Referring again to FIG. 1, Region 142 contains processing for both customer A and customer B. Customer A processing center 144 performs processing for customer A, for example by performing a filtering process at the application layer. Region 142 also contains customer A network devices 146. Processing center 144 in region 142 communicates with M2M service 116, processing center 147, and region 150. Processing center 147 performs similar processing, and communicates with region 158. Regions 150 and 158 are customer A regions which contain customer A network devices 152 and 162, and customer A M2M devices 154 and 160. Also, base station 156 provides coverage in region 142. Region 142 also contains customer B processing center 148, which performs processing, such as location information of reporters or the amount of reporting information in the application layer. Customer B processing center 148 interfaces with region 168, which contains customer B M2M devices 172. There is some overlap between region 168 and region 158. Region 168 contains base station 174, customer B network devices 176, and customer B M2M devices 172. The virtual resources supported by network 120 may be divided into data plane slices that each include only those resources that support a specific M2M service. For example, one data plane slice supported by network 120 may include only those virtualized resources that support the M2M service for customer A. FIG. 2A shows an embodiment SONAC-capable network 200A that may be used in the customized network architecture of network 110 of FIG. 1A. SONAC-capable network 200A includes a network control system 238A that allows SONAC adaptation for M2M services. Network control system 238A includes a network control database 212, an SDT controller 216A, a SONAC coordinator 214, an SDRA controller 218A, an NFV controller 220, an SDP controller 222A, and a TE feeder 224.

SONAC-capable network 200A includes a customized virtual network having logical links connected between logical nodes of a data plane 234, and these logical nodes are implemented in SDP-enabled physical network nodes of the data plane 234. During a routinely performed SONAC update, the SONAC coordinator 214 receives infrastructure information about the physical resources underlying the logical entities of data plane 234. In the embodiment of FIG. 2A, this infrastructure information is provided by an infrastructure manager 240. In other embodiments, this infrastructure information is provided by another virtual network provider. During the routinely performed SONAC update, the SONAC coordinator 214 also retrieves stored service information 206 and a stored infrastructure monitoring update from database 212. SONAC coordinator 214 uses this information to determine an initial network configuration so that the SDT controller 216A may form an initial logical data plane topology of data plane 234.

The stored service information 206 is provided by a Customer Service Manager (CSM) 202 and may include, for example, service level requirements/agreements/specifications, service level traffic distribution or characteristics (e.g., customer distribution, mobility speed predictions, and traffic load predictions), service level virtual function description (e.g. computing resource such as CPU, memory, I/O, storage requirements, ordering of the functions, impact on traffic rate, etc.), and a set of service level logical topologies for the various services supported by network 200A. The stored infrastructure monitoring update that is used to determine the initial network configuration includes stored service information 206, a stored service quality measurement 210, and/or a stored network status 208 of database 212. The stored service quality measurement 210 may be, for example, a measurement of service level traffic quality or QoE performance. The stored network status 208 includes current network traffic load and traffic capacity information. The network control system 238A includes infrastructure monitoring components 232 in data plane 234, which includes an end-to-end traffic monitoring component 228 and a network monitoring component 230. End-to-end traffic monitoring component 228 stores the service quality measurement in the database 212. Network monitoring component 230 stores the network status in the database 212.

In accordance with the initial network configuration determined by SONAC coordinator 214, the SDT controller 216A creates an initial logical data plane topology for the data plane 234. The SDT controller 216A selects logical link topologies along with PoP locations, traffic capacities, and VNFs of logical nodes and respective computing resource requirements in the initial data plane logical topology.

At one or more shorter intervals between routinely performed SONAC updates, the SONAC coordinator 214 retrieves a second infrastructure monitoring update from database 212 and uses it to determine whether to initiate a network-driven update to the network configuration. This second infrastructure monitoring update may further include a stored SDT performance measurement 204. SDT performance measurements may include, for example, measures of logical link quality such as delay, delay jitter, throughput, or traffic-specific queue status of input and/or output queues of routers in data plane 234.

Based on the updated network configuration determined by SONAC coordinator 214, the SDT controller 216A updates the data plane logical topology of data plane 234 as appropriate. In an embodiment, the initial data plane logical topology and/or an updated data plane logical topology includes one or more SSDPLTs each having logical nodes that are v-s-SGWs capable of executing one or multiple VNFs to support a particular service.

The logical nodes of data plane 234 each respectively include one or more VNFs that have lifecycle management provided by the NFV controller 220. This NFV controller 220 supports the SDT controller 216A by configuring the VNFs along target logical links of a path in the data plane 234 that has been selected for handling a service, traffic flow, or a virtual sub-network. The functionality of the initial network configuration or an updated network configuration is broken down into multiple basic VNF functional blocks, and a workflow is developed for the NFV controller 220 to implement these VNFs in the nodes along these target logical links.

The logical nodes are implemented in the data plane 234 at logical nodes that are SDP-enabled nodes controlled by the SDP controller 222A. The SDP controller 222A may support the network control system 238A by performing a respective protocol configuration update for logical nodes of data plane 234 in accordance with the initial network configuration or an updated network configuration. The protocol configuration update may include, for example, installing, enabling, removing, disabling, modifying, or reordering protocols. The protocol stacks and/or the protocols of the logical nodes of data plane 234 are respectively configured by the SDP controller 222A to operate in harmony with the VNFs that are to be instantiated at the logical nodes by the NFV controller 220.

The network control system 238A is also supported by an SDRA controller 218A that makes optimization decisions for resource allocation. Implementation of the resource allocation determined by the SDRA controller 218A is supported by the TE feeder 224 that configures the SDN-enabled infrastructure of the data plane 234 by setting forwarding rules for routers underlying data plane 234, with respect to a particular service supported by these routers, in accordance with the resource allocation. To monitor the respective performance for each service in network 200A, the network control system 238B is also supported by one or multiple distributed instantiations of SDT checkpoint instance(s) 226 that are configurable logical components selectively implemented at points of data plane 234 that have been targeted for close monitoring. SDT checkpoint instance(s) 226 are part of the infrastructure monitoring components 232 of data plane 234, which provide performance and status information to SONAC coordinator 214 by way of database 212. In some embodiments, some or all of SDT checkpoint instance(s) 226 may be implemented as SDT performance monitoring VNFs in logical nodes of data plane 234.

Referring again to FIG. 2A, during an update of the network configuration, dynamic adaptation of SDT checkpoint instance(s) 226 is triggered/enabled by the SONAC coordinator 214, which determines where and what to monitor in the data plane 234. The SONAC coordinator 214 determines whether the NFV controller 220 should perform SDT checkpoint adaptation, which includes adding, configuring, and/or removing a distributed instantiation of SDT checkpoint instance(s) 226. The SONAC coordinator 214 determines whether the NFV controller 220 should instantiate or activate SDT checkpoint instance(s) 226 at any logical nodes in data plane 234 to gain more performance insight for better tuning SDT controller 216A and SDRA controller 218A. The SONAC coordinator 214 also determines whether the NFV controller 220 should remove or de-activate existing SDT checkpoint instance(s) 226 to reduce monitoring overhead when high SDT performance is measured.

The SONAC coordinator 214 also dynamically determines where and how to control network traffic, and via the NFV controller 220, the SONAC coordinator 214 adds, configures and/or removes data plane traffic control VNFs in the data plane 234 on selected logical nodes for each service, to improve or balance service performance among all services. The SONAC coordinator 214 provides to SDT controller 216A any update of the location(s) and configuration(s) of SDT checkpoint instance(s) 226 and any update of the VNF location(s) and configuration(s). Additionally, the SONAC coordinator 214 dynamically enables/triggers SONAC adaptation, which includes adaptation of per service SDT configuration, and/or per service SDT provisioning configuration.

Adapting per service SDT configuration includes SDT controller 216A supporting a particular service by adjusting the SSDPLT optimization inputs (e.g., optimization objective weights, cost measures, etc.). Adapting per service SDT provisioning configuration includes SDRA controller 218A supporting a particular service by adjusting the configuration of how physical resources are allocated in data plane 234. Adapting per service SDT provisioning configuration may include, e.g., adjusting the logical link weights (i.e. flow weights), logical link capacities, number of physical paths per logical link, and SDRA/TE model of SDRA controller 218A, all of which determine how the hardware resources of data plane 234 are provisioned to support the particular service. Adapting per service SDT provisioning configuration by the SONAC coordinator 214 may also include determining what protocol configurations must be updated in order to, for example, support any VNF changes to be instantiated by the NFV controller 220, to address congestion, etc. The SONAC coordinator 214 triggers the SDP controller 222A to implement any such protocol configuration updates at logical network nodes of the data plane 234.

In an example of adapting per service SDT provisioning configuration, each logical link in the initial data plane logical topology is viewed by SDRA controller 218A as a flow, resources in the data plane 234 are all initially allocated by path-model TE during a routinely performed SONAC update, and logical links are initially provisioned via N paths that include D paths for foreground traffic and N-D paths for background traffic. During a network-driven update, the SONAC coordinator 214A adapts the configuration of SDRA controller 218A. In this example, such adaption is performed in accordance with service-specific performance degradation that is specific to each logical link (i.e., per tunnel per service degradation). Such example degradation is measured either in terms of reduced throughput or increased delay and has threshold levels of degradation that increase from threshold $t_1$ to threshold $t_4$. As shown in Table 1 below, the SONAC coordinator 214A updates both the number of physical paths provisioned for foreground traffic, along with the SDRA/TE model for allocating resources for conflicting background traffic, in accordance with the threshold that has been met by the per tunnel per service degradation.

TABLE 1

Example degradation thresholds for SDT provisioning adaptation

| SDT performance degradation threshold | Updated path count for foreground traffic | Updated SDRA/TE model for conflicting background traffic |
| --- | --- | --- |
| $t_1$ | D + 1 | Path-model |
| $t_2$ | D + 2 | Path-model |
| $t_3$ | D + 3 | Path-model |
| $t_4$ | D + 4 | Arc-model |

In the foregoing example, the SDRA controller 218A then solves the following linear optimization problem to determine a resource allocation that maximizes a flow utility function:

$$\max \sum_{f_i \in F} U(a_i) \text{ s.t.}$$

Flow conservation constraints:
$$\begin{cases} \sum_{(u,w) \in E} a_i(u, w) = \sum_{(w,v) \in E} a_i(w, v), \\ \forall w \in V, w \neq s_i, w \neq t_i, \forall f_i \in F_{arc} \\ \sum_{(s_i,u) \in E} a_i(s_i, u) = \sum_{(v,t_i) \in E} a_i(v, t_i), \\ \forall f_i \in F_{arc} \end{cases}$$

Flow satisfaction constraints:
$$\begin{cases} \sum_{(s_i,u) \in E} a_i(s_i, u) = a_i, \forall f_i \in F_{arc} \\ \sum_{p \in P(f_j)} a_j(p) = a_j, \forall f_j \in F_{path}, \\ a_i \leq d_i, \forall f_i \in F_{arc} \cup F_{path} \end{cases}$$

Link capacity constraints:
$$\begin{cases} \sum_{f_i \in F_{arc}} a_i(u, v) + \\ \sum_{f_j \in F_{path}} \sum_{p \in P(f_j)} [\delta_{u,v}(p) a_j(p)] \leq c(u, v), \\ \forall (u, v) \in E \end{cases}$$

where
U(.) is the flow utility function;
$F_{arc}$ is the set of flows using the arc mode; and
$F_{path}$ is the set of flows using the path mode;
V is the node set;
E is the arc set;
$P(f_i)$ is the set of candidate paths of flow $f_i$;
$d_i$ is the rate demand of flow $f_i$;
$a_i$ is the rate allocation of flow $f_i$;
$a_i(p)$ is the rate allocation of flow $f_i$ on path p;

$a_i(u, v)$ is the rate allocation of flow $f_i$ on arc $(u, v)$;
$c(u, v)$ is the capacity of arc $(u, v)$; and
$\delta_{u,v}(p)$ is a binary indicator of whether arc $(u, v)$ belongs to path p.

Figure 2B:
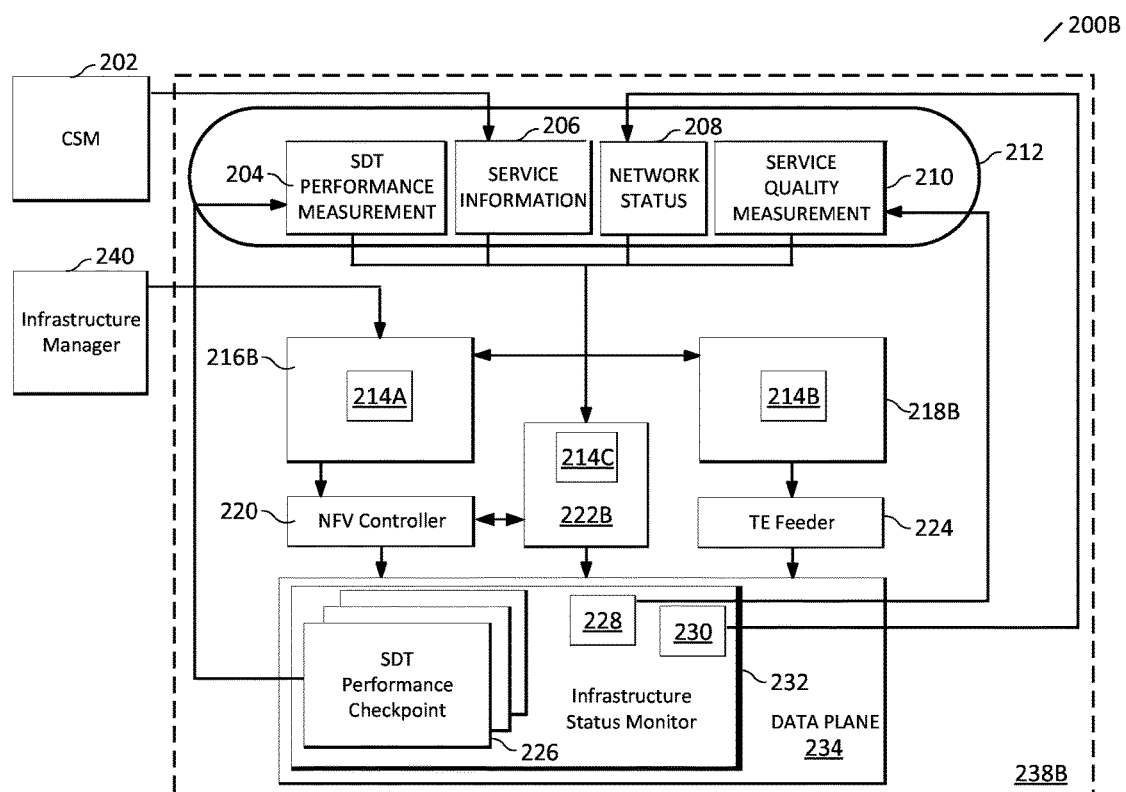
FIG. 2B is a block diagram illustrating an alternative SONAC-capable network that includes a modified network control system, in accordance with embodiments of the present invention.

FIG. 2B shows an alternative embodiment SONAC-capable network 200B that includes a modified network control system 238B. Network control system 238B is identical to network control system 238A of FIG. 2A, except that SONAC coordinator 214 has been implemented in network control system 238B as distributed SONAC coordinator components 214A to 214C. These SONAC components 214A to 214C are respectively hosted in a modified SDT controller 216B, a modified SDRA controller 218B, and a modified SDP controller 222B.

Figure 2C:
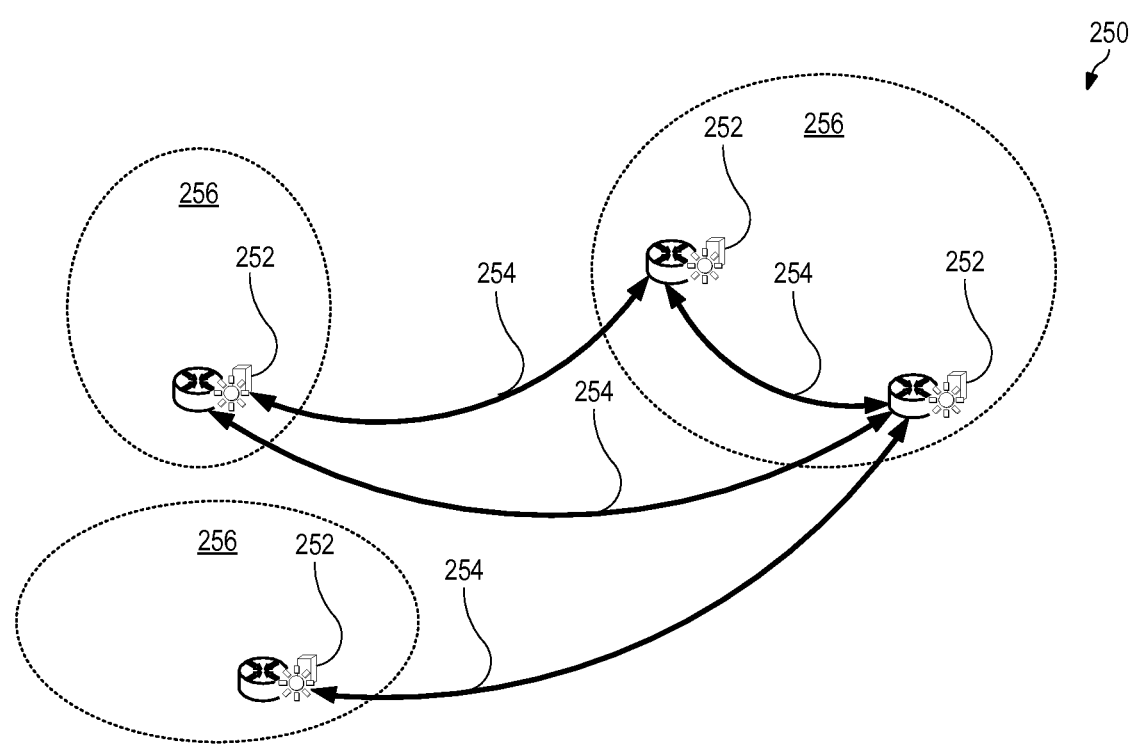
FIG. 2C is a block diagram illustrating a Service-Specific Data Plane Logical Topology (SSDPLT) that may be implemented in a virtual network data plane, in accordance with embodiments of the present invention.

FIG. 2C illustrates an embodiment SSDPLT 250 that may be implemented in data plane 234 of FIG. 2A and FIG. 2B. In the SSDPLT 250, logical nodes 252 are v-s-SGWs that are interconnected by logical links 254. A logical graph of the SSDPLT 250 includes the logical nodes 252 and the logical links 254 that are included in the SSDPLT 250, and to which logical nodes 252 each of the logical links 254 are connected. The logical graph of the SSDPLT 250 also includes a configuration of which physical nodes 256 are PoPs hosting the logical nodes 252 and how much data processing capacity (i.e. computing resources) is provided at each of these logical nodes 252. The physical nodes 256 may be, for example, M2M-specific serving gateways, M2M-specific resources of base stations or ingress routers, etc.

Figure 3:
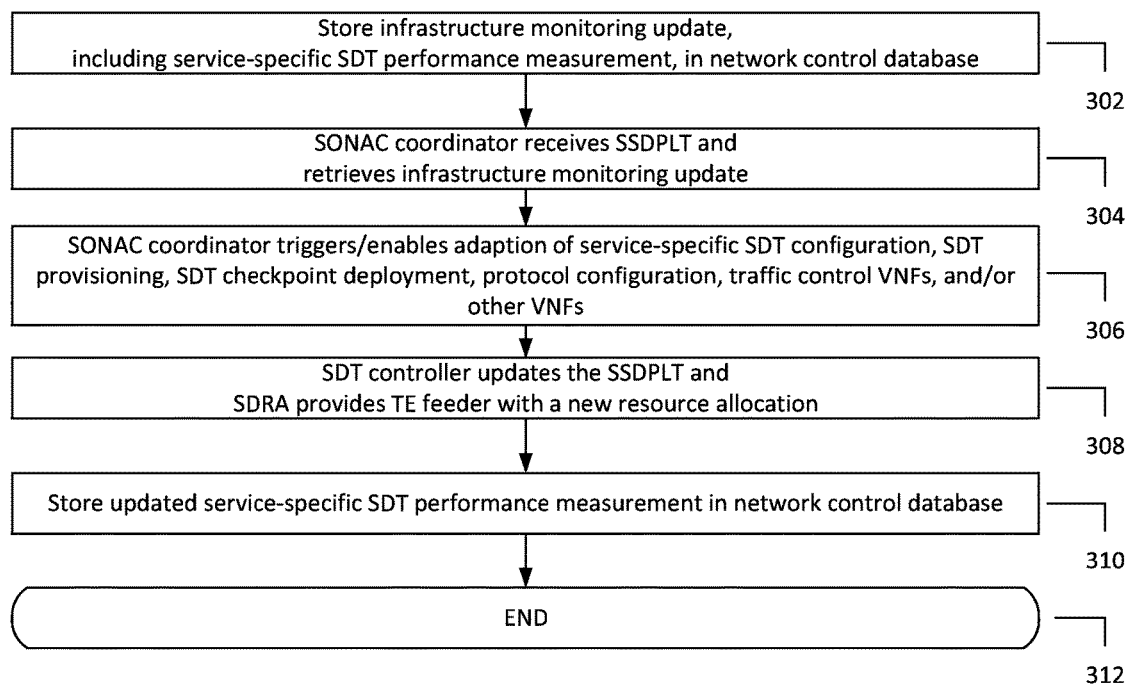
FIG. 3 is a flow diagram illustrating a method for performing dynamic adaption with respect to a particular service supported by a SONAC-capable network, in accordance with embodiments of the present invention.

FIG. 3 shows an embodiment method for performing dynamic service-specific adaptation with respect to a particular service supported by the SONAC-capable network 200A of FIG. 2A. At step 302, infrastructure monitoring components 232 store infrastructure monitoring update in database 212, and this infrastructure monitoring update includes a service-specific performance measurement generated by SDT checkpoint instance(s) 226. The infrastructure monitoring update may also include a service quality measurement and/or a network status. At step 304, the SONAC coordinator 214 retrieves the infrastructure monitoring update from the database 212. The SONAC coordinator 214 also receives an SSDPLT from the SDT controller 216A.

At step 306, based on the information received in step 304, the SONAC coordinator 214 triggers/enables adapting per service SDT configuration, adapting per service SDT provisioning configuration, adapting SDT checkpoint deployment, and adapting traffic control mechanisms to a more optimal state. The SONAC coordinator 214 first determines whether any update of the per service SDT configuration or the per service SDT provisioning configuration should be performed. The SONAC coordinator 214 provides any update of the per service SDT configuration to the SDT controller 216A. The SONAC coordinator 214 also provides any SDRA/TE updates (which includes any adjustments to link provisioning inputs as part of per service SDT provisioning adaptation) to the SDRA controller 218A to trigger it to apply the SDRA/TE updates in a new SDRA optimization. The SONAC coordinator 214 also determines whether the NFV controller 220 should instantiate, activate, remove, or de-activate distributed instantiations of SDT checkpoint instance(s) 226 in data plane 234. The SONAC coordinator 214 also determines whether the NFV controller 220 should adapt VNF configurations by instantiating, activating, removing, or de-activating VNFs in the data plane 234, including traffic control VNFs. In some embodiments, the SONAC coordinator 214 provides to SDT controller 216A any update of the location(s) and configuration(s) of SDT checkpoint instance(s) 226 and any update of the traffic control VNF and other VNF location(s) and configuration(s). In other embodiments, the SONAC coordinator 214 provides any update of the location(s) and configuration(s) of SDT checkpoint instance(s) 226 and any update of the traffic control VNF and other VNF location(s) and configuration(s) directly to the NFV controller 220. The SONAC coordinator 214 also determines what protocol configuration updates must be implemented, including, for example, updates needed to reduce congestion, to support the VNFs, etc. The SONAC coordinator 214 provides any updates to protocol configuration (as part of per service SDT provisioning adaptation) to the SDP controller 222A to trigger it to implement these updates in data plane 234.

At step 308, based on information received from the SONAC coordinator 214 in step 306, the SDT controller 216A implements any update to the SSDPLT. The SDT controller 216A directs the NFV controller 220 to update location(s)/configuration(s) of SDT checkpoint instance(s) 226, traffic control VNFs, and/or other VNFs. Also based on information received from the SONAC coordinator 214 in step 306, the SDRA controller 218A provides the TE feeder 224 with the results of its new optimization so that they may be implemented as forwarding rules for routers underlying data plane 234, with respect to a particular service supported by these routers. At step 310, the SDT checkpoint instance(s) 226 stores an updated service-specific SDT performance measurement in the database 212. The method ends at step 312.

Figure 4A:
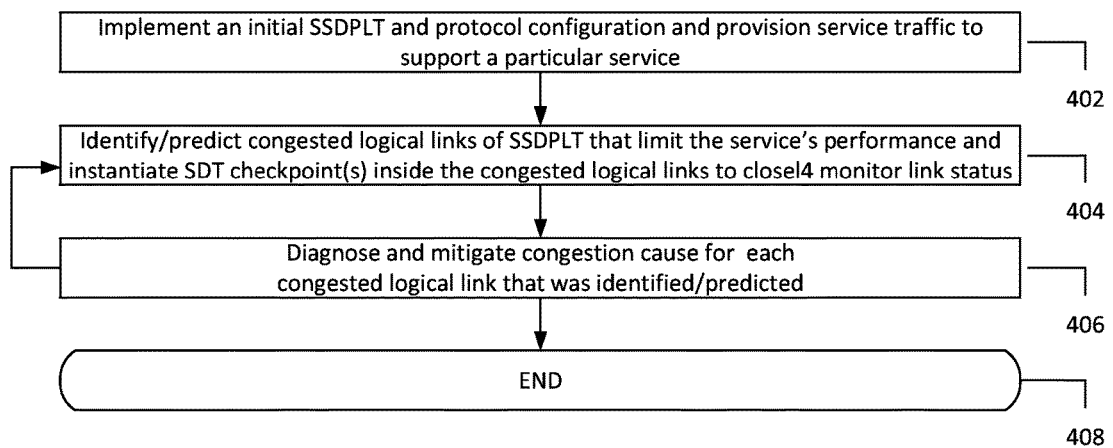
FIG. 4A is a flow diagram illustrating a method for supporting a service of a SONAC-capable network having service-specific traffic congestion, in accordance with embodiments of the present invention.

FIG. 4A shows an embodiment method for supporting a service in a virtual network, that includes diagnosing and mitigating service-specific traffic congestion. Network traffic congestion may occur, for example, at a router when the processing speed of the router processor is too slow relative to the traffic load of the network. This typically results in a large amount of data in the router input queue. For example, the router may be handling a large volume of background traffic packets, which may consume too much of the processor to promptly handle the foreground traffic. A router queue may have a traffic-specific queue status. For example, if there are 100 packets in a router input queue, and 90 of the packets carry voice traffic payloads while 10 packets carry control traffic payloads, the router has a voice-specific queue status of 90 waiting packets and a control-specific queue status of 10 waiting packets.

Router output queues may also become too lengthy when the router's outgoing transmission link becomes congested. This output queue congestion is one example of the network traffic congestion that occurs over a logical link of the virtual network. Such link-related congestion may occur when, for example, the capacity of the one or multiple physical links supporting the logical link is too small relative to the high traffic load over the logical link.

Referring again to FIG. 4A, at step 402, an initial SSDPLT and initial protocol configuration are implemented for a particular service and traffic is provisioned for that service. In an embodiment, the initial protocol configuration includes a default set of protocols ordered in a default protocol stack. At step 404, congested logical links that limit the service's performance are predicted or identified in the SSDPLT, and one or multiple SDT checkpoint instance(s) are instantiated inside the congested logical links to closely monitor the link status. At step 406, for each of the congested logical links that were identified or predicted at step 404, a congestion cause is then diagnosed and mitigated. The method ends at step 408.

Figure 4B:
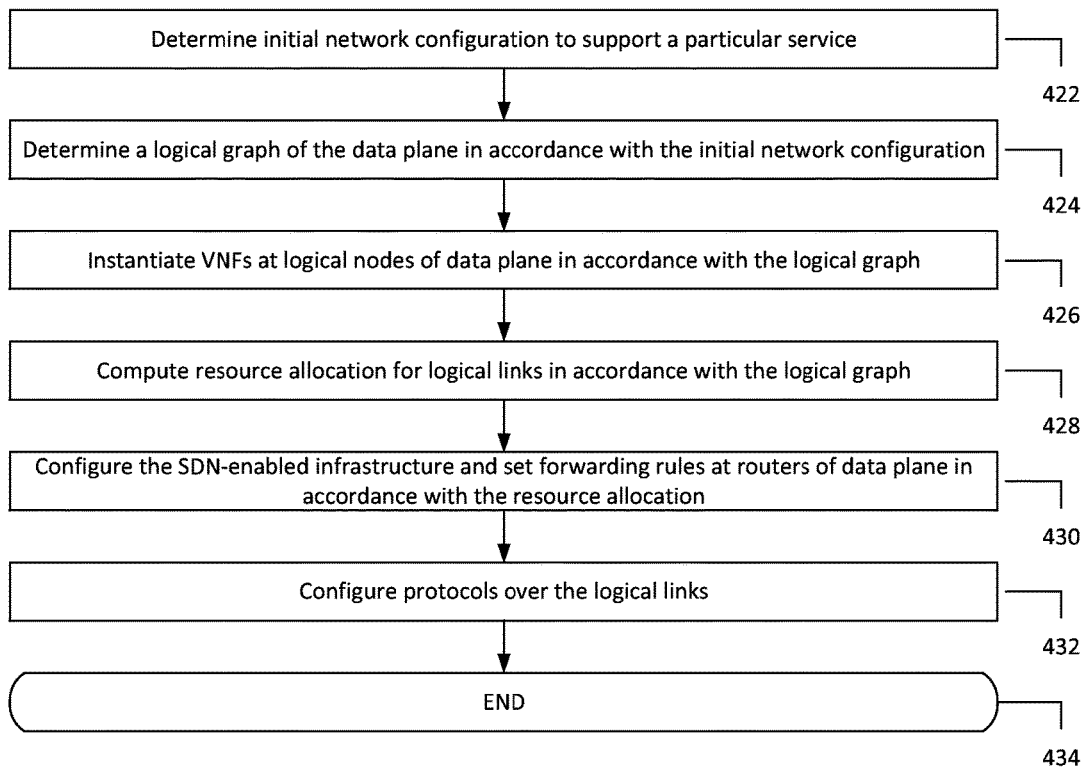
FIG. 4B is a flow diagram illustrating a method for virtual network service instantiation using the network control system of FIG. 2A, in accordance with embodiments of the present invention.

FIG. 4B shows an embodiment method for implementing step 402 of FIG. 4A using a network control system such as, for example, network control system 238A of FIG. 2A or network control system 238B of FIG. 2B. At step 422, a CSM provides a service specification to a SONAC coordinator, which is either a stand-alone SONAC coordinator (e.g., SONAC coordinator 214A of FIG. 2A) or distributed embedded components of a network control system (e.g., SONAC coordination components 214A to 214C of FIG. 2B). An infrastructure manager also provides physical infrastructure information to the SONAC coordinator, and infrastructure monitoring components of data plane 234 provide an infrastructure monitoring update to the SONAC coordinator. Based on this information, the SONAC coordinator determines an initial network configuration. At step 424, an SDT controller (which may host a SONAC coordination component) determines a logical graph of data plane 234 in accordance with the initial network configuration. At step 426, the SDT controller provides the logical graph to an NFV controller, which instantiates VNFs at logical nodes of data plane 234 in accordance with the logical graph. At step 428, an SDRA controller (which may host a SONAC coordination component) then computes an allocation of resources for logical links of data plane 234 in accordance with the logical graph. The SDRA controller provides this resource allocation to a TE feeder. At step 430, the TE feeder configures the SDN-enabled infrastructure of data plane 234 by setting forwarding rules for routers underlying data plane 234, with respect to a particular service supported by these routers, in accordance with the resource allocation. At step 432, an SDP controller (which may host a SONAC coordination component) updates the protocol configuration over the logical links of the logical graph. The method ends at step 434.

Figure 4C:
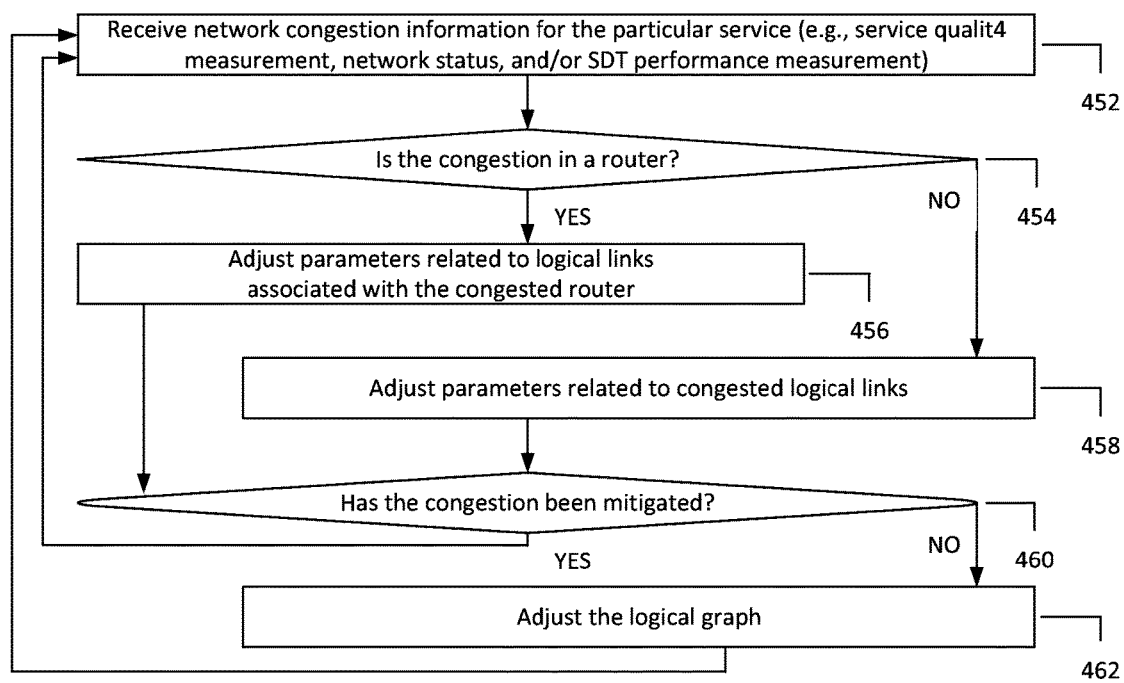
FIG. 4C is a flow diagram illustrating a method for diagnosing and mitigating service-specific traffic congestion using the network control system of FIG. 2A, in accordance with embodiments of the present invention.

FIG. 4C shows an embodiment method for implementing steps 404 and 406 of FIG. 4A using a network control system such as, for example, network control system 238A of FIG. 2A or network control system 238B of FIG. 2B. At step 452, infrastructure monitoring component(s) provide network congestion event information to a SONAC coordinator so that it may identify and/or predict and then diagnose a network congestion problem. The network congestion event information is a service-specific infrastructure monitoring update that may include a network status, service quality measurement, and/or an SDT performance measurement for a particular service. The SONAC coordinator is either a stand-alone SONAC coordinator (e.g., SONAC coordinator 214A of FIG. 2A) or distributed embedded components of a network control system (e.g., SONAC coordination components 214A to 214C of FIG. 2B).

At step 454, if the SONAC coordinator diagnoses the network congestion as a router-related problem, then flow continues at step 456. Otherwise, flow continues at step 458. At step 456, an adjustment is triggered for parameters of target logical links that are associated with the congested router, including, for example, adjusting a packet aggregation VNF at logical nodes that are interconnected by target logical links associated with the congested router, increasing prioritization of traffic flows through the target logical links, configuring TE traffic flows outside the target logical links so that the congested router is at least partially bypassed, and/or adjusting a protocol configuration over the target logical links. In this disclosure, "partially bypassing" a logical link, physical link, or router refers to enforcing flow allocation for a particular service to respect the capacity limit of the link or router and/or giving flow allocation more freedom to avoid overloading the link or router. In an embodiment, enforcement of a capacity limit of a link or router may not be initially activated when the network is under-loaded. In an embodiment, the capacity limit of a link or router includes a safety margin to accommodate for traffic variation.

Referring again to FIG. 4C, when the parameter adjustment of the target logical links at step 456 includes enforcing the capacity limit of the congested router, such enforcement may be implemented in various ways such as, for example, incorporating input queue size minimization/balancing for the congested router as part of the SDRA optimization. Flow then continues at step 460.

At step 458, an adjustment for link-related congestion is triggered for parameters of congested logical links. This link-related congestion adjustment may include, for example, applying a traffic shaping VNF on logical nodes that are connected by the congested logical links to shape background traffic in the congested logical links, configuring TE traffic flows outside the congested logical links so that the congested logical links are at least partially bypassed, and/or changing the TE configuration of logical link parameters for the congested logical links (e.g., the number of physical paths provisioned for foreground traffic, the SDRA/TE model for allocating resources for conflicting background traffic, etc.) At step 460, the SONAC coordinator receives an infrastructure monitoring update from infrastructure monitoring components. If the congestion problem has been mitigated, the method ends at step 464. If the router-related congestion problem has not been mitigated, then flow continues at step 462. At step 462, the SDT controller adjusts the logical graph of data plane 234 to try to mitigate the congestion problem. The method then ends at step 464.

Figure 4D:
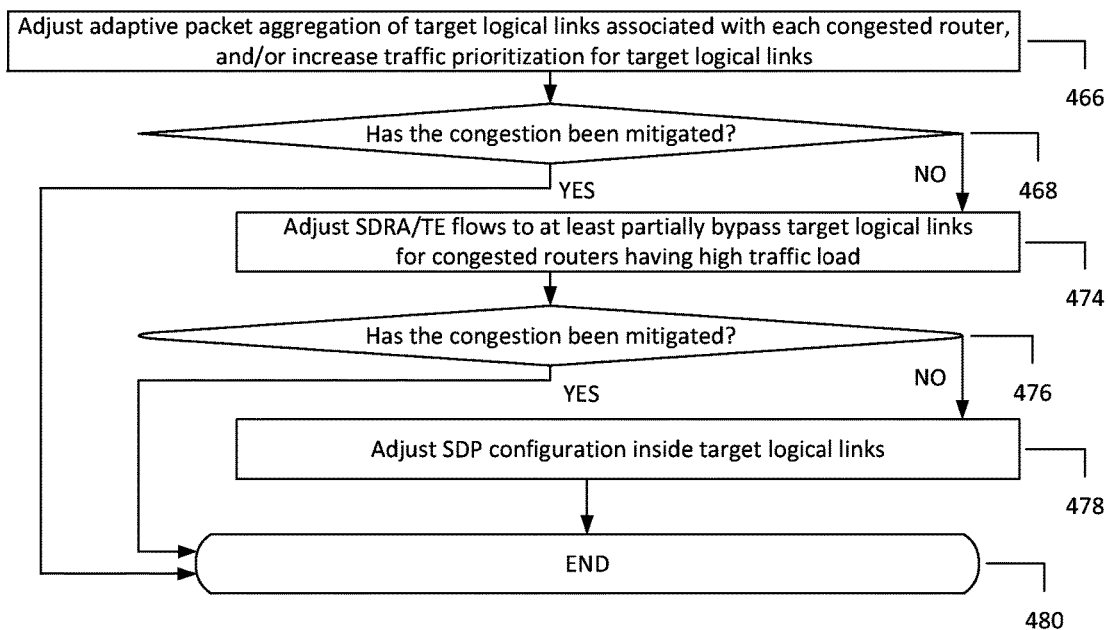
FIG. 4D is a flow diagram illustrating a method for mitigating router-related traffic congestion using the network control system of FIG. 2A, in accordance with embodiments of the present invention.

FIG. 4D shows an embodiment method for implementing step 456 of FIG. 4C. At step 466, an adjustment is made to VNF configurations of nodes connected to target logical link(s) associated with each congested router. This VNF configuration adjustment includes one or more of the following: adjusting adaptive packet aggregation over the target logical link(s); and/or increasing traffic prioritization for the target logical link(s). At step 468, if the congestion has been mitigated, the method ends at step 480. Otherwise, flow continues at step 474, where SDRA/TE flows are adjusted to at least partially bypass target logical link(s) associated with any congested routers that are highly loaded. At step 476, if the congestion has been mitigated, the method ends at step 480. Otherwise, flow continues at step 478, where a protocol configuration is adjusted inside target logical links. For example, a protocol stack may be simplified by removing or deactivating one or more protocols at the SDP-enabled nodes of data plane 234 that are interconnected by the target logical links. The method ends at step 480.

Figure 4E:
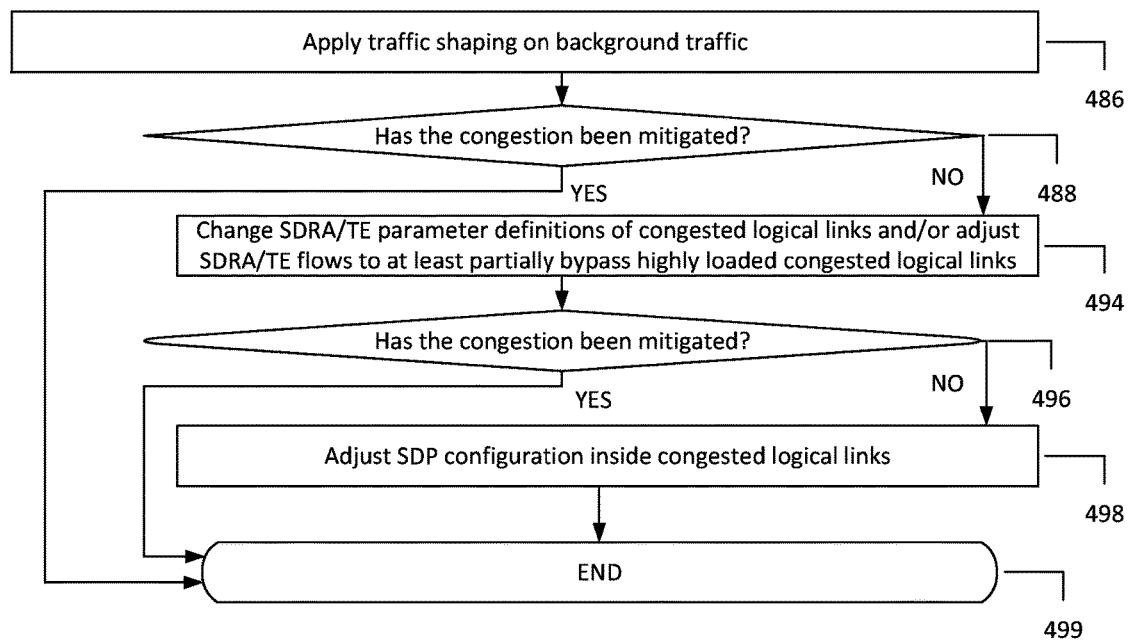
FIG. 4E is a flow diagram illustrating a method for mitigating link-related traffic congestion using the network control system of FIG. 2A, in accordance with embodiments of the present invention.

FIG. 4E shows an embodiment method for implementing step 458 of FIG. 4C. At step 486, for each congested logical link, traffic shaping is selectively applied on any background traffic that is susceptible to traffic shaping. At step 488, if the congestion has been mitigated, the method ends at step 499. Otherwise, flow continues at step 494, where one or both of the following SDRA/TE adjustments is made as part of per-service SDT provisioning adaptation: (1) the SDRA/TE configuration is changed for parameters of congested logical link(s); and/or (2) SDRA/TE flows are adjusted to at least partially bypass congested logical link(s) that have high traffic load. In an embodiment, the SDRA/TE configuration is changed by allocating more physical links to support the congested logical link(s). At step 496, if the congestion has been mitigated, the method ends at step 499. Otherwise, flow continues at step 498, where per-service SDT provisioning adaptation continues by adjusting the protocol configuration at SDP-enabled nodes that are connected by the congested logical links. For example, for an M2M service having large packet quantities and small packet payloads, adjusting the protocol configuration to reduce header size may mitigate congestion in the congested logical link(s). The method ends at step 499.

Figure 5A:
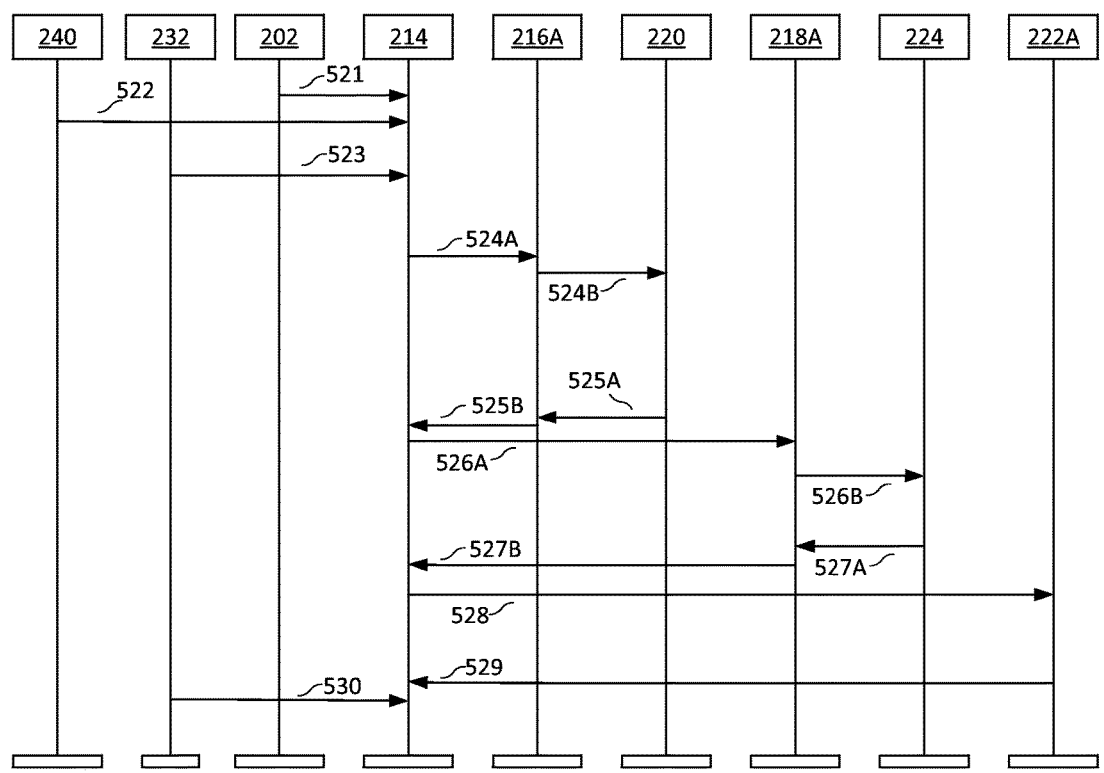
FIG. 5A is a signal diagram illustrating signals for virtual network service instantiation using the network control system of FIG. 2A, in accordance with embodiments of the present invention.

FIG. 5A shows embodiment signals for forming the SONAC-capable network 200A of FIG. 2A in accordance with an initial network configuration. CSM 202 provides a service specification 521 to SONAC coordinator 214, infrastructure manager 240 provides physical infrastructure information 522 to SONAC coordinator 214, and infrastructure monitoring components 232 provides a network status 523 to SONAC coordinator 214 so that SONAC coordinator 214 may determine an initial network configuration 524A.

SONAC coordinator 214 provides this initial network configuration 524A to SDT controller 216A so that the SDT controller 216A may determine a logical graph 524B of data plane 234. SDT controller 216A then provides the logical graph 524B to NFV controller 220. After instantiating VNFs at logical nodes of data plane 234 in accordance with the logical graph 524B, NFV controller 220 provides an acknowledgement signal 525A to SDT controller 216A. SDT controller 216A then provides to SONAC coordinator 214 a signal 525B that includes both an acknowledgement signal and the logical graph.

SONAC coordinator 214 then provides an SDRA trigger signal 526A to SDRA controller 218A so that SDRA controller 218A will compute an allocation of resources for links of data plane 234. SDRA controller 218A then provides this resource allocation 526B to TE feeder 224. After configuring the SDN-enabled infrastructure by setting forwarding rules for routers underlying data plane 234, with respect to a particular service supported by these routers, TE feeder 224 sends an acknowledgement signal 527A to SDRA controller 218A. SDRA controller 218A then sends an acknowledgement signal 527B to SONAC coordinator 214. SONAC coordinator 214 then sends an SDP trigger signal 528 so that SDP controller 222A will configure protocols over the logical links of data plane 234. After configuring these protocols, SDP controller 222A sends an acknowledgement signal 529 to SONAC coordinator 214, which then receives a second infrastructure monitoring update 530 from infrastructure monitoring components 232.

Figure 5B:
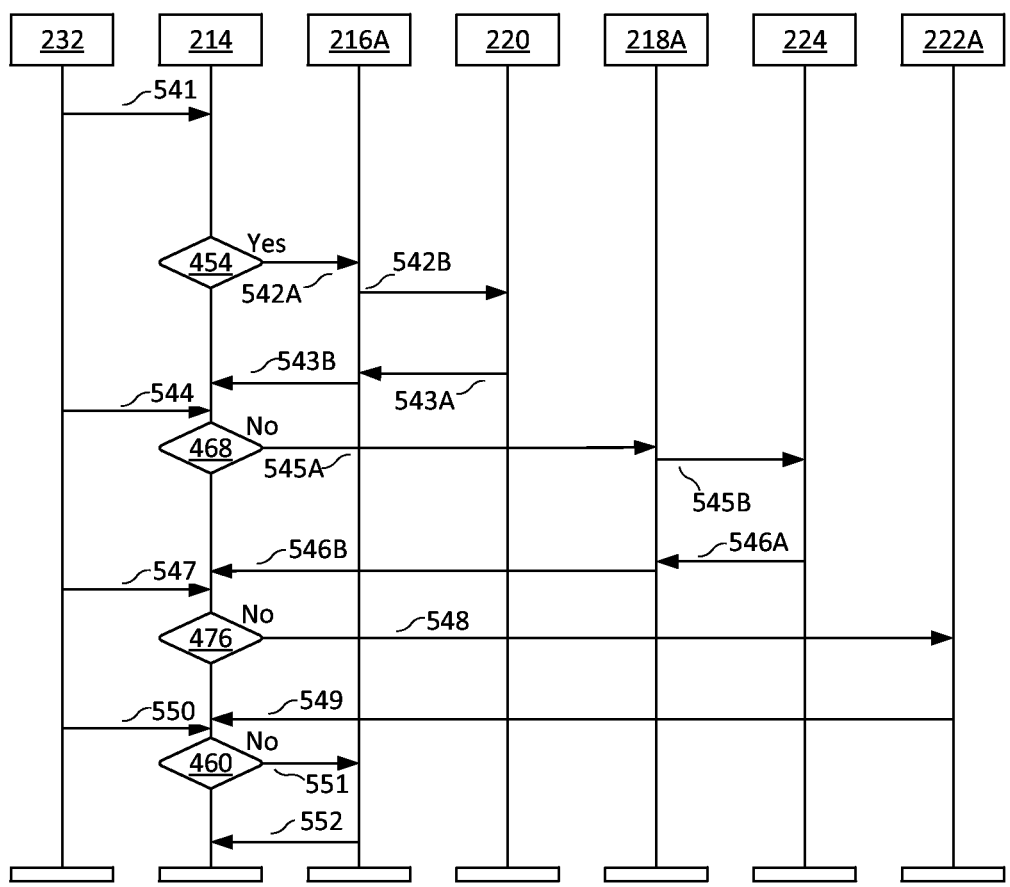
FIG. 5B is a signal diagram illustrating signals for updating the configuration of the virtual network of FIG. 2A during router-related congestion, in accordance with embodiments of the present invention.

FIG. 5B shows embodiment signals for updating the configuration of SONAC-capable network 200A of FIG. 2A during router-related congestion. Infrastructure monitoring components 232 provides network congestion event information 541 to SONAC coordinator 214 so that SONAC coordinator 214 may analyze and diagnose the network congestion problem. The network congestion event information 541 is an infrastructure monitoring update that may include a network status, service quality measurement, and/or SDT performance measurement.

If SONAC coordinator 214 diagnoses the network congestion as a router-related problem at step 454 (shown in FIG. 4C), then SONAC coordinator 214 sends a signal 542A to SDT controller 216A indicating that the network congestion is a router-related problem. SDT controller 216A then sends a signal 542B directing NFV controller 220 to make an adjustment to VNF configurations of nodes connected to target logical link(s) associated with each congested router. This VNF configuration adjustment includes one or more of the following: adjusting adaptive packet aggregation over the target logical link(s); and/or increasing traffic prioritization for the target logical link(s). Once NFV controller 220 has adjusted the VNF configuration, it sends an acknowledgment signal 543 to the SONAC coordinator 214.

The SONAC coordinator 214 then receives an infrastructure monitoring update 544 from infrastructure monitoring components 232 to check whether the congestion problem has been mitigated. If the congestion problem is not mitigated at step 468 (shown in FIG. 4D), the SONAC coordinator 214 sends a signal 545A to SDRA controller 218A instructing it to determine a resource allocation that adjusts traffic flows to try to mitigate the router-related congestion problem, including, for example, configuring traffic flows outside the target logical links so that the congested router is at least partially bypassed. SDRA provides resource allocation 545B to TE feeder 224. TE feeder 224 updates forwarding rules for routers underlying data plane 234, with respect to a particular service supported by these routers, in accordance with the resource allocation, and then TE feeder 224 provides an acknowledgment signal 546A to SDRA controller 218A. SDRA controller 218A then provides an acknowledgment signal 546B to SONAC coordinator 214, which then receives another infrastructure monitoring update 547 from infrastructure monitoring components 232.

If the congestion problem is not mitigated at step 476 (shown in FIG. 4D), the SONAC coordinator 214 sends a signal 548 to SDP controller 222A instructing it to adjust a protocol configuration over the target logical links to try to mitigate the router-related congestion problem. Once SDP controller 222A has adjusted this protocol configuration, it sends an acknowledgment signal 549 to SONAC coordinator 214, which then receives another infrastructure monitoring update 550 from infrastructure monitoring components 232. If the congestion problem is not mitigated at step 460 (shown in FIG. 4C), the SONAC coordinator 214 sends a signal 551 to SDT controller 216A to trigger the SDT controller 216A to adjust the logical graph of data plane 234 to try to mitigate the congestion problem. SDT controller 216A determines an updated logical graph of data plane 234 and then provides an acknowledgement signal 552 to SONAC coordinator 214.

Figure 5C:
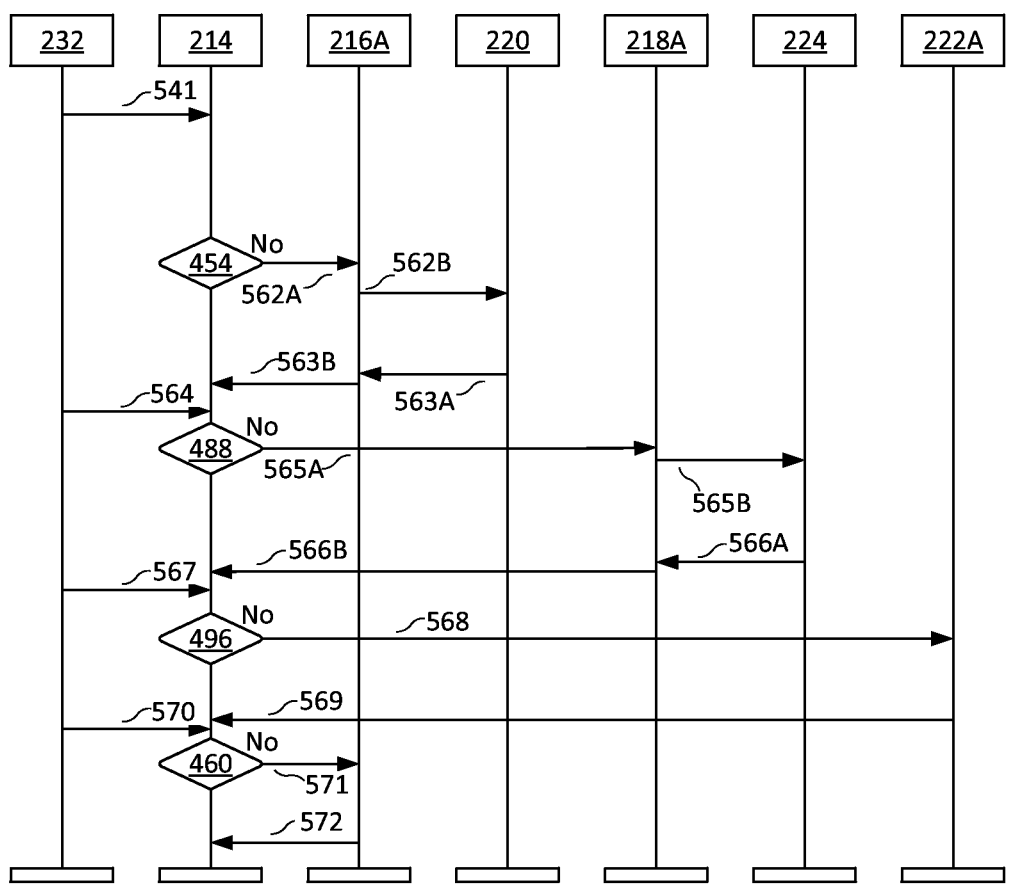
FIG. 5C is a signal diagram illustrating signals for updating the configuration of the virtual network of FIG. 2A during link-related congestion, in accordance with embodiments of the present invention.

FIG. 5C shows embodiment signals for updating the configuration of SONAC-capable network 200A of FIG. 2A during link-related congestion. Infrastructure monitoring components 232 provides network congestion event information 541 to SONAC coordinator 214 so that SONAC coordinator 214 may analyze and diagnose the network congestion problem. If SONAC coordinator 214 diagnoses the network congestion as not being router-related at step 454 (shown in FIG. 4C), then SONAC coordinator 214 sends a signal 562A to SDT controller 216A indicating that the network-congestion is a link-related problem. SDT controller 216A then sends a signal 562B directing NFV controller 220 to apply a traffic shaping VNF on logical nodes connecting the congested logical links, where this traffic shaping VNF attempts to shape background traffic over the congested logical links. Once NFV controller 220 has applied the traffic shaping VNF, it sends an acknowledgment signal 563 to the SONAC coordinator 214.

The SONAC coordinator 214 then receives an infrastructure monitoring update 564 from infrastructure monitoring components 232 to check whether the congestion problem has been mitigated. If the congestion problem is not mitigated at step 488 (shown in FIG. 4E), the SONAC coordinator 214 sends a signal 565A to SDRA controller 218A instructing it to adjust TE traffic flows to try to mitigate the link-related congestion problem. SDRA controller 218A then determines a resource allocation 565B that adjusts TE traffic flows to try to mitigate the link-related congestion problem, including, for example, changing the TE configuration of logical link parameters for the congested logical link, and/or configuring TE traffic flows outside the congested logical link so that the congested logical link is at least partially bypassed. SDRA controller 218A then provides resource allocation 565B to TE feeder 224. The TE feeder 224 updates forwarding rules for routers underlying data plane 234, with respect to a particular service supported by these routers, in accordance with the resource allocation, and then TE feeder 224 provides an acknowledgment signal 566A to SDRA controller 218A. SDRA controller 218A then provides an acknowledgment signal 566B to SONAC coordinator 214, which then receives another infrastructure monitoring update 567 from infrastructure monitoring components 232.

If the congestion problem is not mitigated at step 496 (shown in FIG. 4E), the SONAC coordinator 214 sends a signal 568 to SDP controller 222A instructing it to adjust a protocol configuration over the congested logical links to try to mitigate the congestion problem. Once SDP controller 222A has adjusted this protocol configuration, it sends an acknowledgment signal 569 to SONAC coordinator 214, which then receives another infrastructure monitoring update 570 from infrastructure monitoring components 232. If the congestion problem is not mitigated at step 460 (shown in FIG. 4C), the SONAC coordinator 214 sends a signal 571 to SDT controller 216A to trigger the SDT controller 216A to adjust the logical graph of data plane 234 to try to mitigate the congestion problem. SDT controller 216A determines an updated logical graph of data plane 234 and then provides an acknowledgement signal 572 to SONAC coordinator 214.

Figure 6A:
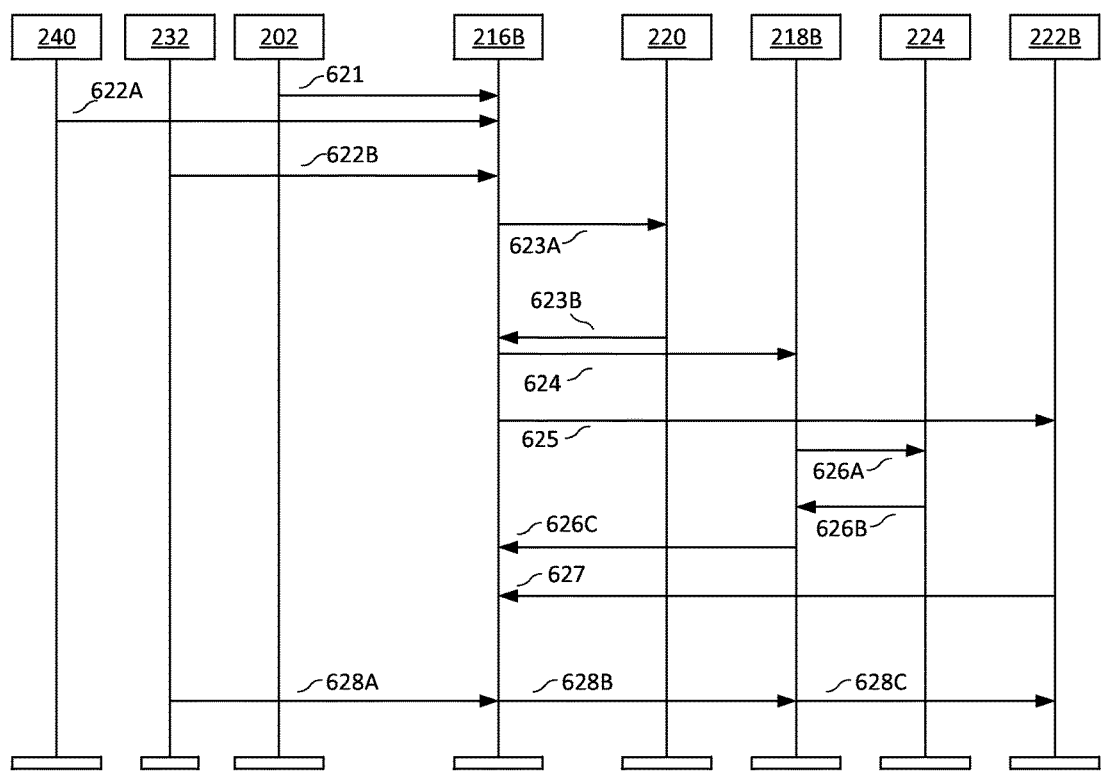
FIG. 6A is a signal diagram illustrating signals for virtual network service instantiation using the network control system of FIG. 2B, in accordance with embodiments of the present invention.

FIG. 6A shows embodiment signals for forming the SONAC-capable network 200B of FIG. 2B in accordance with an initial network configuration. CSM 202 provides a service specification 621 to SDT controller 216B, infrastructure manager 240 provides physical infrastructure information 622A to SDT controller 216B, and infrastructure monitoring components 232 provide an infrastructure monitoring update 622B to SDT controller 216B so that it may determine an initial network configuration and a logical graph 623A of data plane 234. SDT controller 216A then provides the logical graph 623A to NFV controller 220. After instantiating VNFs at logical nodes of data plane 234 in accordance with the logical graph 623A, NFV controller 220 provides an acknowledgement signal 623B to SDT controller 216B.

SDT controller 216B then provides to SDRA controller 218B a signal 624, which includes the logical graph, to trigger the SDRA controller 218B to compute a resource allocation for the logical links of the logical graph. SDT controller 216B also sends a signal 625, which includes the logical graph, to trigger SDP controller 222B to configure SDP over the logical links of data plane 234.

After computing resource allocation 626A, SDRA controller 218B provides this resource allocation to TE feeder 224. After then configuring the SDN-enabled infrastructure by setting forwarding rules for routers underlying data plane 234, with respect to a particular service supported by these routers, TE feeder 224 sends an acknowledgement signal 626B to SDRA controller 218B. SDRA controller 218B then sends an acknowledgement signal 626C to SDT controller 216B.

After updating the protocol configuration of data plane 234, SDP controller 222B sends an acknowledgment signal 627 to SDT controller 216B, which then receives a second infrastructure monitoring update in signal 628A from infrastructure monitoring components 232. The infrastructure monitoring update is provided in signal 628B by SDT controller 216B to SDRA controller 218B, and is also provided in signal 628C by SDRA controller 218B to SDP controller 222B.

Figure 6B:
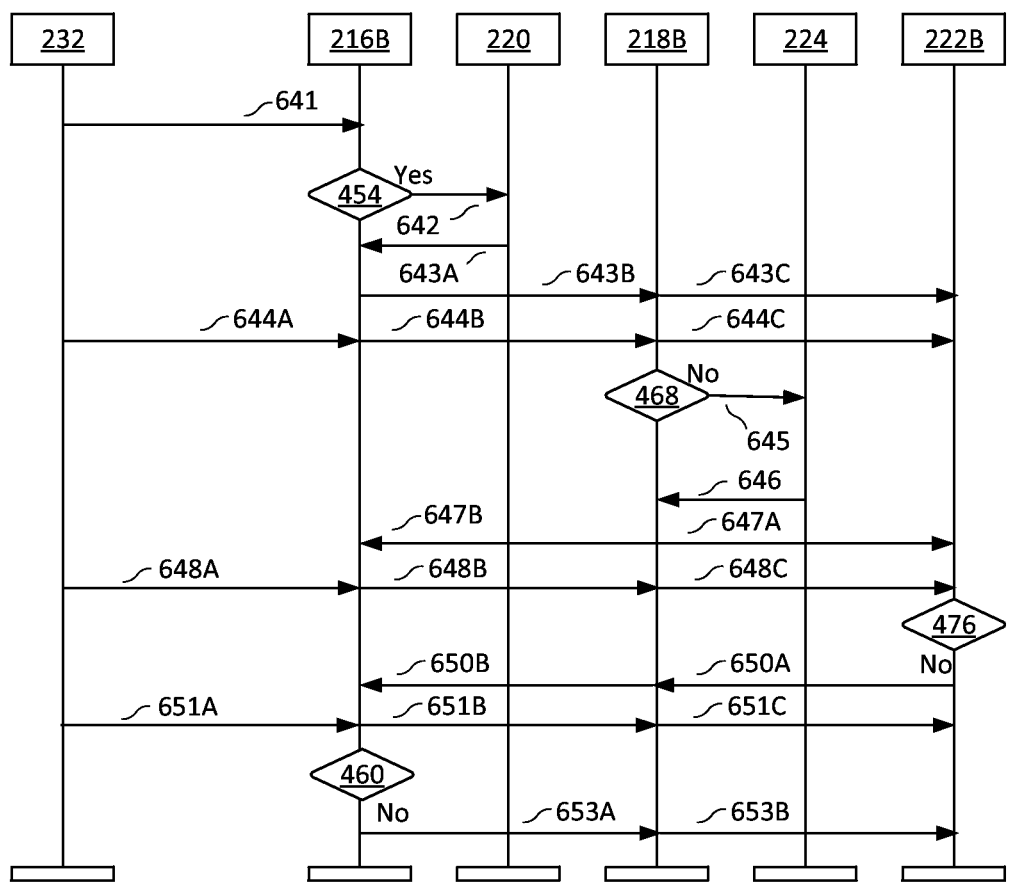
FIG. 6B is a signal diagram illustrating signals for updating the configuration of the virtual network of FIG. 2B during router-related congestion, in accordance with embodiments of the present invention.

FIG. 6B shows embodiment signals for updating the configuration of SONAC-capable network 200B of FIG. 2B during router-related congestion. Infrastructure monitoring components 232 provide network congestion event information 641 to SDT controller 216B so that it may analyze and diagnose the network congestion problem. The network congestion event information 641 is an infrastructure monitoring update that may include a network status, service quality measurement, and/or SDT performance measurement.

If SDT controller 216B diagnoses the network congestion as a router-related problem at step 454 (shown in FIG. 4C), then it sends a signal 642 directing NFV controller 220 to make an adjustment to VNF configurations of nodes connected to target logical link(s) associated with each congested router. This VNF configuration adjustment includes one or more of the following: adjusting adaptive packet aggregation over the target logical link(s); and/or increasing traffic prioritization for the target logical link(s). Once NFV controller 220 has adjusted the VNF configuration, it sends an acknowledgment signal 643A to the SDT controller 216B.

The SDT controller 216B then receives an infrastructure monitoring update 644A from infrastructure monitoring components 232 to check whether the congestion problem has been mitigated. The SDT controller 216B provides this infrastructure monitoring update in signal 644B to SDRA controller 218B, which also provides the infrastructure monitoring update in signal 644C to SDP controller 222B. If the congestion problem is not mitigated at step 468 (shown in FIG. 4D), the SDRA controller 218B determines a resource allocation 645 that adjusts traffic flows to try to mitigate the router-related congestion problem, including, for example, configuring traffic flows outside the target logical links so that the congested router is at least partially bypassed. SDRA provides resource allocation 645 to TE feeder 224. TE feeder 224 updates forwarding rules at affected routers of data plane 234 in accordance with the resource allocation, and then TE feeder 224 provides an acknowledgment signal 646 to SDRA controller 218B. SDRA controller 218B then provides, in signals 647A and 647B, a message that includes an acknowledgement and a description of the action just performed. SDRA controller sends signal 647A to SDP controller 222B and signal 647B to SDT controller 216B.

SDT controller 216B then receives another infrastructure monitoring update 648A from infrastructure monitoring components 232. SDT controller 216B provides this infrastructure monitoring update in signal 648B to SDRA controller 218B, which also provides the infrastructure monitoring update in signal 648C to SDP controller 222B. If the congestion problem is not mitigated at step 476 (shown in FIG. 4D), the SDP controller 222B adjusts a protocol configuration over the target logical links to try to mitigate the router-related congestion problem. Once SDP controller 222B has adjusted this protocol configuration, it sends message 650A, which includes an acknowledgement and a description of the action just performed, to SDRA controller 218B, which forwards this message as signal 650B to SDT controller 216B.

SDT controller 216B then receives another infrastructure monitoring update 651A from infrastructure monitoring components 232. SDT controller 216B provides this infrastructure monitoring update in signal 651B to SDRA controller 218B, which also provides the infrastructure monitoring update in signal 651C to SDP controller 222B. If the congestion problem is not mitigated at step 460 (shown in FIG. 4C), the SDT controller 216B adjusts the logical graph of data plane 234 to try to mitigate the congestion problem. SDT controller 216B then provides message 653A, which includes an acknowledgement and a description of the action just performed, to SDRA controller 218B, which forwards this message as signal 653B to SDP controller 222B.

Figure 6C:
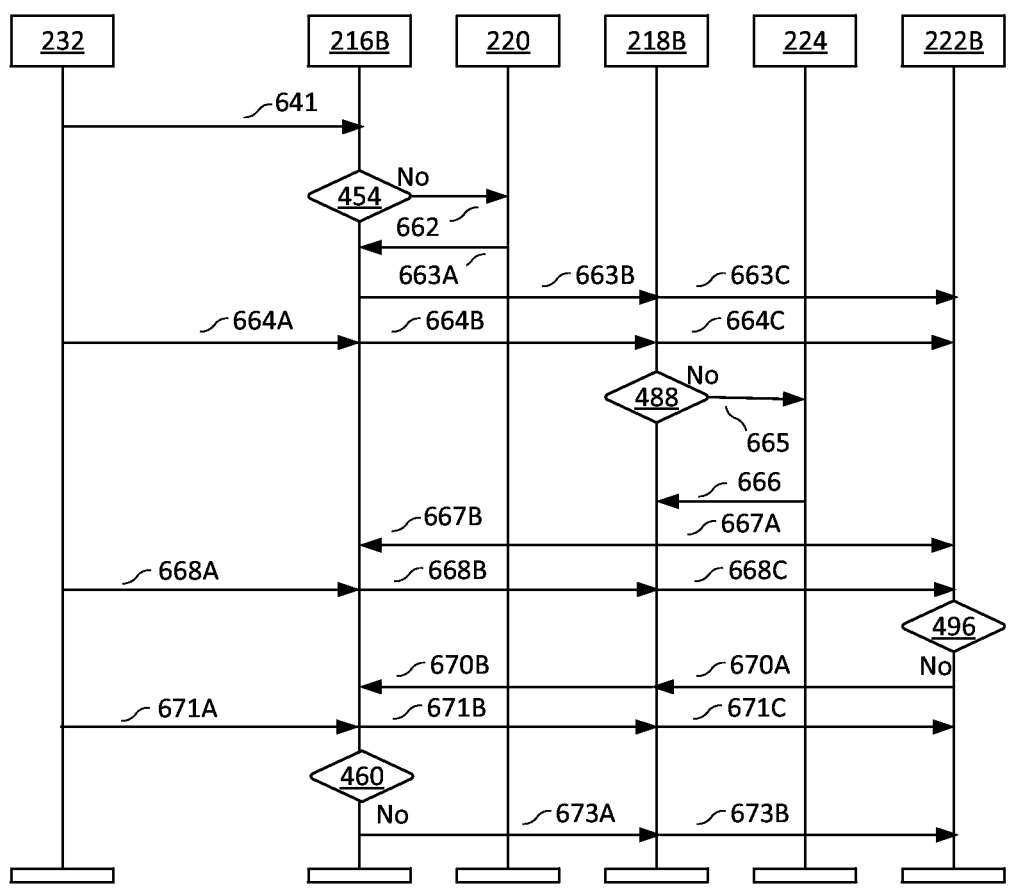
FIG. 6C is a signal diagram illustrating signals for updating the configuration of the virtual network of FIG. 2B during link-related congestion, in accordance with embodiments of the present invention.

FIG. 6C shows embodiment signals for updating the configuration of SONAC-capable network 200B of FIG. 2B during link-related congestion. Infrastructure monitoring components 232 provide network congestion event information 641 to SDT controller 216B so that it may analyze and diagnose the network congestion problem. If SDT controller 216B diagnoses the network congestion as a link-related problem at step 454 (shown in FIG. 4C), then it sends a signal 662 directing NFV controller 220 to apply traffic shaping on background traffic in the congested logical links. Once NFV controller 220 has applied one or more traffic shaping VNFs, it sends an acknowledgment signal 663A to the SDT controller 216B.

The SDT controller 216B then receives an infrastructure monitoring update 664A from infrastructure monitoring components 232 to check whether the congestion problem has been mitigated. The SDT controller 216B provides this infrastructure monitoring update in signal 664B to SDRA controller 218B, which also provides the infrastructure monitoring update in signal 664C to SDP controller 222B. If the congestion problem is not mitigated at step 488 (shown in FIG. 4E), the SDRA controller 218B determines a resource allocation 665 that adjusts traffic flows to try to mitigate the link-related congestion problem, including, for example, changing the TE configuration of logical link parameters for the congested logical link, and/or configuring TE traffic flows outside the congested logical link so that the congested logical link is at least partially bypassed. SDRA provides resource allocation 665 to TE feeder 224. TE feeder 224 updates forwarding rules at affected routers of data plane 234 in accordance with the resource allocation, and then TE feeder 224 provides an acknowledgment signal 666 to SDRA controller 218B. SDRA controller 218B then provides, in signals 667A and 667B, a message that includes an acknowledgement and a description of the action just performed. SDRA controller sends signal 667A to SDP controller 222B and signal 667B to SDT controller 216B.

SDT controller 216B then receives another infrastructure monitoring update 668A from infrastructure monitoring components 232. SDT controller 216B provides this infrastructure monitoring update in signal 668B to SDRA controller 218B, which also provides the infrastructure monitoring update in signal 668C to SDP controller 222B. If the congestion problem is not mitigated at step 496 (shown in FIG. 4E), the SDP controller 222B adjusts a protocol configuration over the congested logical links to try to mitigate the link-related congestion problem. Once SDP controller 222B has adjusted this protocol configuration, it sends message 670A, which includes an acknowledgement and a description of the action just performed, to SDRA controller 218B, which forwards this message as signal 670B to SDT controller 216B.

SDT controller 216B then receives another infrastructure monitoring update 671A from infrastructure monitoring components 232. SDT controller 216B provides this infrastructure monitoring update in signal 671B to SDRA controller 218B, which also provides the infrastructure monitoring update in signal 671C to SDP controller 222B. If the congestion problem is not mitigated at step 460 (shown in FIG. 4C), the SDT controller 216B adjusts the logical graph of data plane 234 to try to mitigate the congestion problem. SDT controller 216B then provides message 673A, which includes an acknowledgement and a description of the action just performed, to SDRA controller 218B, which forwards this message as signal 673B to SDP controller 222B.

Figure 7A:
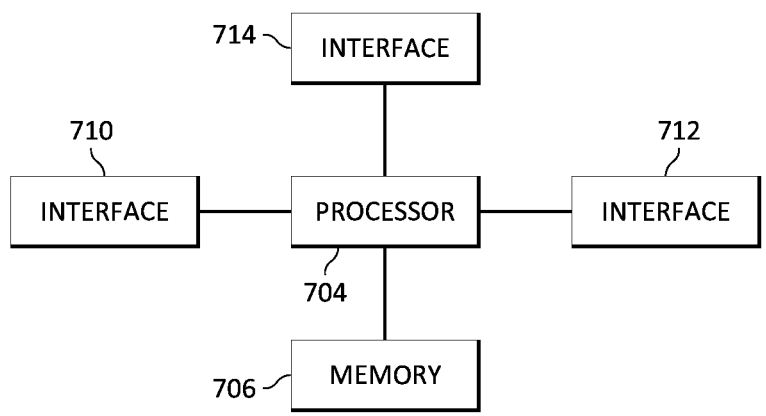
FIG. 7A illustrates a block diagram of a processing system for performing methods described herein, which may be installed in a host device, in accordance with embodiments of the present invention.

FIG. 7A illustrates a block diagram of an embodiment processing system 700 for performing methods described herein, which may be installed in a host device. As shown, the processing system 700 includes a processor 704, a memory 706, and interfaces 710-714, which may (or may not) be arranged as shown in FIG. 7. The processor 704 may be any component or collection of components adapted to perform computations and/or other processing related tasks, and the memory 706 may be any component or collection of components adapted to store programming and/or instructions for execution by the processor 704. In an embodiment, the memory 706 includes a non-transitory computer readable medium. The interfaces 710, 712, 714 may be any component or collection of components that allow the processing system 700 to communicate with other devices/components and/or a user. For example, one or more of the interfaces 710, 712, 714 may be adapted to communicate data, control, or management messages from the processor 704 to applications installed on the host device and/or a remote device. As another example, one or more of the interfaces 710, 712, 714 may be adapted to allow a user or user device (e.g., Personal Computer (PC), etc.) to interact/communicate with the processing system 700. The processing system 700 may include additional components not depicted in FIG. 7, such as long term storage (e.g., non-volatile memory, etc.).

In some embodiments, the processing system 700 is included in a network device that is accessing, or part otherwise of, a telecommunications network. In one example, the processing system 700 is in a network-side device in a wireless or wireline telecommunications network, such as a base station, a relay station, a scheduler, a controller, a gateway, a router, an applications server, or any other device in the telecommunications network. In other embodiments, the processing system 700 is in a user-side device accessing a wireless or wireline telecommunications network, such as a mobile station, a UE, a PC, a tablet, a wearable communications device (e.g., a smartwatch, etc.), or any other device adapted to access a telecommunications network.

Figure 7B:
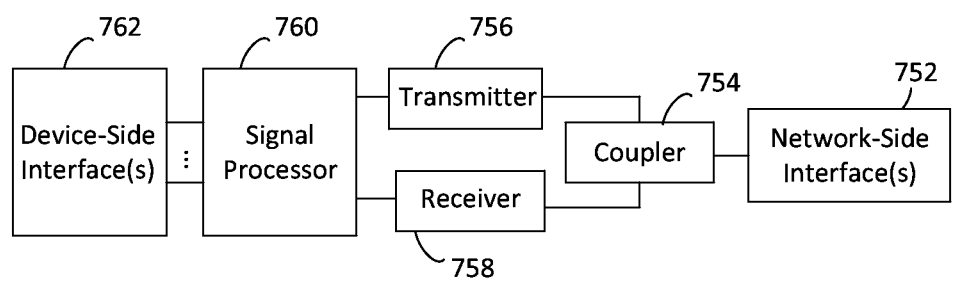
FIG. 7B illustrates a block diagram of a transceiver adapted to transmit and receive signaling over a telecommunications network, in accordance with embodiments of the present invention.

In some embodiments, one or more of the interfaces 710, 712, 714 connects the processing system 700 to a transceiver adapted to transmit and receive signaling over the telecommunications network. FIG. 7B illustrates a block diagram of a transceiver 750 adapted to transmit and receive signaling over a telecommunications network. The transceiver 750 may be installed in a host device. As shown, the transceiver 750 comprises a network-side interface 752, a coupler 754, a transmitter 756, a receiver 758, a signal processor 760, and a device-side interface 762. The network-side interface 752 may include any component or collection of components adapted to transmit or receive signaling over a wireless or wireline telecommunications network. The coupler 754 may include any component or collection of components adapted to facilitate bi-directional communication over the network-side interface 752. The transmitter 756 may include any component or collection of components (e.g., up-converter, power amplifier, etc.) adapted to convert a baseband signal into a modulated carrier signal suitable for transmission over the network-side interface 752. The receiver 758 may include any component or collection of components (e.g., down-converter, low noise amplifier, etc.) adapted to convert a carrier signal received over the network-side interface 752 into a baseband signal. The signal processor 760 may include any component or collection of components adapted to convert a baseband signal into a data signal suitable for communication over the device-side interface(s) 762, or vice-versa. The device-side interface(s) 762 may include any component or collection of components adapted to communicate data-signals between the signal processor 760 and components within the host device (e.g., the processing system 700, Local Area Network (LAN) ports, etc.).

The transceiver 750 may transmit and receive signaling over any type of communications medium. In some embodiments, the transceiver 750 transmits and receives signaling over a wireless medium. For example, the transceiver 750 may be a wireless transceiver adapted to communicate in accordance with a wireless telecommunications protocol, such as a cellular protocol (e.g., Long-Term Evolution (LTE), etc.), a Wireless Local Area Network (WLAN) protocol (e.g., Wi-Fi, etc.), or any other type of wireless protocol (e.g., Bluetooth, Near Field Communication (NFC), etc.). In such embodiments, the network-side interface 752 comprises one or more antenna/radiating elements. For example, the network-side interface 752 may include a single antenna, multiple separate antennas, or a multi-antenna array configured for multi-layer communication, e.g., Single Input Multiple Output (SIMO), Multiple Input Single Output (MISO), Multiple Input Multiple Output (MIMO), etc. In other embodiments, the transceiver 750 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Illustrative embodiments of the present invention have the advantage of providing enhanced network performance and QoS/QoE assurance. In some embodiments, a network control system may coordinate a network-driven real-time adaptation of data plane logical topology to allow improved performance, reduced overhead of the routinely performed network update process, or an extended duration between routinely performed network updates.

The following additional example embodiments of the present invention are also provided. In accordance with a first example embodiment of the present invention a method for network adaptation is provided. The method includes receiving, by an adaptation coordinator of a virtual network, a performance measurement generated at a performance checkpoint located in a the virtual network. The method also includes generating, by the adaptation coordinator, a first update of a service-specific configuration of the virtual network. The first update includes at least one of a modification of a performance checkpoint configuration, a modification of a Virtual Network Function (VNF) configuration, a modification of a protocol configuration, a modification of a resource allocation input, or a modification of a logical graph. The service-specific configuration includes a configuration of a plurality of logical nodes and a plurality of logical links of the virtual network in accordance with a service-specific data plane logical topology.

Also, the foregoing first example embodiment may be implemented to include one or more of the following additional features. The method may also be implemented further to include providing the first update to a first controller of the virtual network. The method may also be implemented such that the first controller includes at least one of a Software Defined Topology (SDT) controller, a Software Defined Protocol (SDP) controller, or a Software Defined Resource Allocation (SDRA) controller.

The method may also be implemented such that the modification of the performance checkpoint configuration includes at least one of a modification of a performance checkpoint location, a deletion of a performance checkpoint, or an instantiation of a performance checkpoint. The method may also be implemented such that the modification of the VNF configuration includes at least one of a modification of a VNF location, a deactivation of a VNF instance, a deletion of a VNF instance, an activation of a VNF instance, or an instantiation of a VNF instance. The method may also be implemented such that the modification of the protocol configuration includes at least one of a modification of a protocol definition, a deactivation of a protocol instance, a deletion of a protocol instance, an activation of a protocol instance, an instantiation of a protocol instance, or a reordering of protocol execution.

The method may also be implemented such that the modification of the logical graph includes at least one of a modification of a logical node location, a deletion of a logical node, an addition of a logical node, a modification of a traffic capacity of a logical node, a modification of a logical link location, a deletion of a logical link, or an addition of a logical link. The method may also be implemented such that a data plane of the virtual network comprises the plurality of logical nodes and the plurality of logical links. The method may also be implemented such that the performance measurement includes at least one of delay, delay jitter, throughput, or a router queue status. The method may also be implemented such that the a network service associated with the service-specific configuration includes a machine-to-machine service. The method may also be implemented such that the first controller includes a portion of the adaptation coordinator.

The method may also be implemented such that the modification of the resource allocation input includes at least one of: a modification to prevent a flow allocation from exceeding a first capacity limit to include one of a capacity limit of a first logical link of the plurality of logical links of the data plane, a capacity limit of a router, or a capacity limit of a physical link; a modification to permit the flow allocation to avoid overloading the first logical link; a modification to permit the flow allocation to avoid overloading the router; a modification to permit the flow allocation to avoid overloading the physical link; or a modification in a quantity of physical paths to be allocated for the first logical link. The method may also be implemented such that the modification of the VNF configuration includes at least one of a modification of adaptive packet aggregation of the first logical link, a modification of a traffic shaping configuration of the first logical link, or a modification of traffic prioritization of the first logical link. The method may also be implemented such that the performance measurement indicates traffic congestion is present at an input queue of a router associated with the first logical link.

The method may also be implemented such that the modification of traffic prioritization includes an increase in traffic prioritization of the first logical link. The method may also be implemented such that the modification of the protocol configuration includes at least one of a reordering of protocol execution for the first logical link, a modification of a definition of a first protocol previously instantiated on the first logical link, an activation of the first protocol, a deactivation of the first protocol, or a deletion of the first protocol.

The method may also be implemented such that the first capacity limit further includes a safety margin for accommodating traffic variation, and the modification of the protocol configuration includes a reduction of a packet header size of the first logical link. The method may also be implemented such that: the performance measurement indicates traffic congestion is present at the first logical link and the traffic congestion is not present at an input queue of a router associated with the first logical link; the modification of the traffic shaping configuration includes at least one of an instantiation of a traffic shaping VNF to shape background traffic of the first logical link, or an activation of a traffic shaping VNF to shape background traffic of the first logical link; and the modification in the quantity of physical paths includes an increase in the quantity of physical paths to be allocated for the first logical link.

In accordance with a second example embodiment of the present invention, a method for network adaptation is provided. The method includes receiving a performance measurement generated at a performance checkpoint located in a virtual network. The method also includes modifying a service-specific configuration of the virtual network in accordance with the performance measurement during a first configuration update that does not include modifying a logical graph of the virtual network. The modifying the service-specific configuration includes at least one of modifying a performance checkpoint configuration, modifying a VNF configuration, modifying a protocol configuration, or modifying a resource allocation input. The service-specific configuration includes a configuration of a plurality of logical nodes and a plurality of logical links of the virtual network.

Also, the foregoing second example embodiment may be implemented to include one or more of the following additional features. The method may also be implemented such that the modifying the performance checkpoint configuration includes at least one of modifying a performance checkpoint location, deleting a performance checkpoint, or adding a performance checkpoint. The method may also be implemented such that the modifying the VNF configuration includes at least one of modifying a VNF location, deactivating a VNF instance, deleting a VNF instance, activating a VNF instance, or adding a VNF instance. The method may also be implemented such that the modifying the protocol configuration includes at least one of modifying a protocol definition, deleting a protocol instance, adding a protocol, or modifying a protocol stack. The method may also be implemented such that the logical graph includes all logical locations of the plurality of logical nodes, all logical locations of the plurality of logical links, and all traffic flow capacities of the plurality of logical nodes. The method may also be implemented such that a data plane of the virtual network comprises the plurality of logical nodes and the plurality of logical links.

The method may also be implemented such that the performance measurement includes at least one of delay, delay jitter, throughput, or a router queue status. The method may also be implemented such that a network service associated with the service-specific configuration includes a machine-to-machine service. The method may also be implemented such that modifying the resource allocation input includes at least one of preventing a flow allocation from exceeding a first capacity limit to include one of a capacity limit of a first logical link of the plurality of logical links of the data plane, a capacity limit of a router, or a capacity limit of a physical link, permitting the flow allocation to avoid overloading the first logical link, permitting the flow allocation to avoid overloading the router, permitting the flow allocation to avoid overloading the physical link, or modifying a quantity of physical paths to be allocated for the first logical link. The method may also be implemented such that the modifying the VNF configuration includes at least one of a modifying adaptive packet aggregation of the first logical link, modifying a traffic shaping configuration of the first logical link, or modifying a traffic prioritization of the first logical link.

The method may also be implemented such that the performance measurement indicates traffic congestion is present at an input queue of a router associated with the first logical link. The method may also be implemented such that the modifying the traffic prioritization includes increasing the traffic prioritization of the first logical link. The method may also be implemented such that the modifying the protocol configuration includes at least one of reordering protocol execution for the first logical link, modifying a definition of a first protocol previously instantiated on the first logical link, activating the first protocol, deactivating the first protocol, or deleting the first protocol.

The method may also be implemented such that the first capacity limit further includes a safety margin for accommodating traffic variation, and the modifying the protocol configuration includes reducing a packet header size of the first logical link. The method may also be implemented such that the performance measurement indicates traffic congestion is present at the first logical link and the traffic congestion is not present at an input queue of a router associated with the first logical link. The method may also be implemented such that the modifying the traffic shaping configuration includes at least one of instantiating a traffic shaping VNF to shape background traffic of the first logical link, or activating a traffic shaping VNF to shape background traffic of the first logical link. The method may also be implemented such that the modifying the quantity of physical paths includes increasing the quantity of physical paths to be allocated for the first logical link.

In accordance with a third example embodiment of the present invention, an adaptation coordinator is provided. The adaptation coordinator includes a processor and a non-transitory computer readable storage medium storing programming for execution by the processor. The programming includes instructions to receive a performance measurement generated at a performance checkpoint located in a virtual network and generate a first update of a service-specific configuration of the virtual network. The first update includes at least one of a modification of a performance checkpoint configuration, a modification of a VNF configuration, a modification of a protocol configuration, a modification of a resource allocation input, or a modification of a logical graph. The service-specific configuration includes a configuration of a plurality of logical nodes of the virtual network and a plurality of logical links of the virtual network in accordance with a service-specific data plane logical topology.

Also, the foregoing third example embodiment may be implemented to include one or more of the following additional features. The adaptation coordinator may also be implemented such that the programming further includes instructions to provide the first update to a first controller of the virtual network. The adaptation coordinator may also be implemented such that the first controller includes at least one of a SDT controller, a SDP controller, or an SDRA controller. The adaptation coordinator may also be implemented such that the modification of the performance checkpoint configuration includes at least one of a modification of a performance checkpoint location, a deletion of a performance checkpoint, or an instantiation of a performance checkpoint. The adaptation coordinator may also be implemented such that the modification of the VNF configuration includes at least one of a modification of a VNF location, a deactivation of a VNF instance, a deletion of a VNF instance, an activation of a VNF instance, or an instantiation of a VNF instance.

The adaptation coordinator may also be implemented such that the modification of the protocol configuration includes at least one of a modification of a protocol definition, a deactivation of a protocol instance, a deletion of a protocol instance, an activation of a protocol instance, an instantiation of a protocol instance, or a reordering of protocol execution. The adaptation coordinator may also be implemented such that the modification of the logical graph includes at least one of a modification of a logical node location, a deletion of a logical node, an addition of a logical node, a modification of a traffic capacity of a logical node, a modification of a logical link location, a deletion of a logical link, or an addition of a logical link. The adaptation coordinator may also be implemented such that a data plane of the virtual network comprises the plurality of logical nodes and the plurality of logical links. The adaptation coordinator may also be implemented such that the performance measurement includes at least one of delay, delay jitter, throughput, or router queue status. The adaptation coordinator may also be implemented such that a network service associated with the service-specific configuration includes a machine-to-machine service.

The adaptation coordinator may also be implemented such that the modification of the resource allocation input includes at least one of: a modification to prevent a flow allocation from exceeding a first capacity limit to include one of a capacity limit of a first logical link of the plurality of logical links of the data plane, a capacity limit of a router, or a capacity limit of a physical link; a modification to permit the flow allocation to avoid overloading the first logical link; a modification to permit the flow allocation to avoid overloading the router; a modification to permit the flow allocation to avoid overloading the physical link; or a modification in a quantity of physical paths to be allocated for the first logical link.

The adaptation coordinator may also be implemented such that the modification of the VNF configuration includes at least one of a modification of adaptive packet aggregation of the first logical link, a modification of a traffic shaping configuration of the first logical link, or a modification of traffic prioritization of the first logical link. The adaptation coordinator may also be implemented such that the performance measurement indicates traffic congestion is present at an input queue of a router associated with the first logical link. The adaptation coordinator may also be implemented such that the modification of traffic prioritization includes an increase in traffic prioritization of the first logical link. The adaptation coordinator may also be implemented such that the modification of the protocol configuration includes at least one of a reordering of protocol execution for the first logical link, a modification of a definition of a first protocol previously instantiated on the first logical link, an activation of the first protocol, a deactivation of the first protocol, or a deletion of the first protocol.

The adaptation coordinator may also be implemented such that the first capacity limit further includes a safety margin for accommodating traffic variation, and the modification of the protocol configuration includes a reduction of a packet header size of the first logical link. The adaptation coordinator may also be implemented such that the performance measurement indicates traffic congestion is present at the first logical link and the traffic congestion is not present at an input queue of a router associated with the first logical link. The adaptation coordinator may also be implemented such that the modification of the traffic shaping configuration includes at least one of an instantiation of a traffic shaping VNF to shape background traffic of the first logical link, or an activation of a traffic shaping VNF to shape background traffic of the first logical link. The adaptation coordinator may also be implemented such that the modification in the quantity of physical paths includes an increase in the quantity of physical paths to be allocated for the first logical link.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for network adaptation, comprising:
   receiving, by an adaptation coordinator of a virtual network, a performance measurement, comprising at least one of logical link delay, logical link delay jitter, logical link throughput, or router queue status, generated at a performance checkpoint located in the virtual network; and
   generating, by the adaptation coordinator, a first update of a service-specific configuration of the virtual network in accordance with the performance measurement,
   the first update comprising at least one of a modification of a performance checkpoint configuration, a modification of a virtual network function (VNF) configuration, a modification of a protocol configuration, a modification of a resource allocation input, or a modification of a logical graph, and
   the service-specific configuration comprising a configuration of a plurality of logical nodes and a plurality of logical links of the virtual network in accordance with a service-specific data plane logical topology.

2. The method of claim 1, further comprising:
   providing the first update to a first controller of the virtual network, wherein:
     the first controller comprises at least one of a software defined topology (SDT) controller, a software defined protocol (SDP) controller, or a software defined resource allocation (SDRA) controller;
     the modification of the performance checkpoint configuration comprises at least one of a modification of a performance checkpoint location, a deletion of a performance checkpoint, or an instantiation of a performance checkpoint;
     the modification of the VNF configuration comprises at least one of a modification of a VNF location, a deactivation of a VNF instance, a deletion of a VNF instance, an activation of a VNF instance, or an instantiation of a VNF instance;

the modification of the protocol configuration comprises at least one of a modification of a protocol definition, a deactivation of a protocol instance, a deletion of a protocol instance, an activation of a protocol instance, an instantiation of a protocol instance, or a reordering of protocol execution;

the modification of the logical graph comprises at least one of a modification of a logical node location, a deletion of a logical node, an addition of a logical node, a modification of a traffic capacity of a logical node, a modification of a logical link location, a deletion of a logical link, or an addition of a logical link; and a data plane of the virtual network comprises the plurality of logical nodes and the plurality of logical links.

3. The method of claim 2, wherein a network service associated with the service-specific configuration comprises a machine-to-machine service.

4. The method of claim 2, wherein the first controller comprises a portion of the adaptation coordinator.

5. The method of claim 1, wherein the modification of the resource allocation input comprises at least one of a modification to prevent a flow allocation from exceeding a first capacity limit comprising one of a capacity limit of a first logical link of the plurality of logical links of the data plane, a capacity limit of a router, or a capacity limit of a physical link, a modification to permit the flow allocation to avoid overloading the first logical link, a modification to permit the flow allocation to avoid overloading the router, a modification to permit the flow allocation to avoid overloading the physical link, or a modification in a quantity of physical paths to be allocated for the first logical link.

6. The method of claim 5, wherein the modification of the VNF configuration comprises at least one of a modification of adaptive packet aggregation of the first logical link, a modification of a traffic shaping configuration of the first logical link, or a modification of traffic prioritization of the first logical link.

7. The method of claim 6, wherein:

the performance measurement indicates traffic congestion is present at an input queue of a router associated with the first logical link;

the modification of traffic prioritization comprises an increase in traffic prioritization of the first logical link; and the modification of the protocol configuration comprises at least one of a reordering of protocol execution for the first logical link, a modification of a definition of a first protocol previously instantiated on the first logical link, an activation of the first protocol, a deactivation of the first protocol, or a deletion of the first protocol.

8. The method of claim 6, wherein the first capacity limit further comprises a safety margin for accommodating traffic variation, and the modification of the protocol configuration comprises a reduction of a packet header size of the first logical link.

9. The method of claim 6, wherein:

the performance measurement indicates traffic congestion is present at the first logical link and the traffic congestion is not present at an input queue of a router associated with the first logical link;

the modification of the traffic shaping configuration comprises at least one of an instantiation of a traffic shaping VNF to shape background traffic of the first logical link, or an activation of a traffic shaping VNF to shape background traffic of the first logical link; and the modification in the quantity of physical paths comprises an increase in the quantity of physical paths to be allocated for the first logical link.

10. A method for network adaptation, comprising:

receiving a performance measurement, comprising at least one of logical link delay, logical link delay jitter, logical link throughput, or router queue status, generated at a performance checkpoint located in a virtual network; and modifying a service-specific configuration of the virtual network in accordance with the performance measurement during a first configuration update that does not include modifying a logical graph of the virtual network, the modifying the service-specific configuration comprising at least one of modifying a performance checkpoint configuration, modifying a virtual network function (VNF) configuration, modifying a protocol configuration, or modifying a resource allocation input, and the service-specific configuration comprising a configuration of a plurality of logical nodes and a plurality of logical links of the virtual network.

11. The method of claim 10, wherein:

the modifying the performance checkpoint configuration comprises at least one of modifying a performance checkpoint location, deleting a performance checkpoint, or adding a performance checkpoint;

the modifying the VNF configuration comprises at least one of modifying a VNF location, deactivating a VNF instance, deleting a VNF instance, activating a VNF instance, or adding a VNF instance;

the modifying the protocol configuration comprises at least one of modifying a protocol definition, deleting a protocol instance, adding a protocol, or modifying a protocol stack;

the logical graph consists of all logical locations of the plurality of logical nodes, all logical locations of the plurality of logical links, and all traffic flow capacities of the plurality of logical nodes; and a data plane of the virtual network comprises the plurality of logical nodes and the plurality of logical links.

12. The method of claim 11, wherein a network service associated with the service-specific configuration comprises a machine-to-machine service.

13. The method of claim 10, wherein modifying the resource allocation input comprises at least one of preventing a flow allocation from exceeding a first capacity limit comprising one of a capacity limit of a first logical link of the plurality of logical links of the data plane, a capacity limit of a router, or a capacity limit of a physical link, permitting the flow allocation to avoid overloading the first logical link, permitting the flow allocation to avoid overloading the router, permitting the flow allocation to avoid overloading the physical link, or modifying a quantity of physical paths to be allocated for the first logical link.

14. The method of claim 13, wherein the modifying the VNF configuration comprises at least one of a modifying adaptive packet aggregation of the first logical link, modifying a traffic shaping configuration of the first logical link, or modifying a traffic prioritization of the first logical link.

15. The method of claim 14, wherein:
the performance measurement indicates traffic congestion is present at an input queue of a router associated with the first logical link;
the modifying the traffic prioritization comprises increasing the traffic prioritization of the first logical link; and
the modifying the protocol configuration comprises at least one of reordering protocol execution for the first logical link, modifying a definition of a first protocol previously instantiated on the first logical link, activating the first protocol, deactivating the first protocol, or deleting the first protocol.

16. The method of claim 14, wherein
the first capacity limit further comprises a safety margin for accommodating traffic variation, and
the modifying the protocol configuration comprises reducing a packet header size of the first logical link.

17. The method of claim 14, wherein:
the performance measurement indicates traffic congestion is present at the first logical link and the traffic congestion is not present at an input queue of a router associated with the first logical link;
the modifying the traffic shaping configuration comprises at least one of instantiating a traffic shaping VNF to shape background traffic of the first logical link, or activating a traffic shaping VNF to shape background traffic of the first logical link; and
the modifying the quantity of physical paths comprises increasing the quantity of physical paths to be allocated for the first logical link.

18. An adaptation coordinator, comprising:
a processor;
a non-transitory computer readable storage medium storing programming for execution by the processor, the programming comprising instructions to:
receive a performance measurement, comprising at least one of logical link delay, logical link delay jitter, logical link throughput, or router queue status, generated at a performance checkpoint located in a virtual network; and
generate a first update of a service-specific configuration of the virtual network in accordance with the performance measurement,
the first update comprising at least one of a modification of a performance checkpoint configuration, a modification of a virtual network function (VNF) configuration, a modification of a protocol configuration, a modification of a resource allocation input, or a modification of a logical graph, and
the service-specific configuration comprising a configuration of a plurality of logical nodes of the virtual network and a plurality of logical links of the virtual network in accordance with a service-specific data plane logical topology.

19. The adaptation coordinator of claim 18, wherein:
the programming further comprises instructions to provide the first update to a first controller of the virtual network;
the first controller comprises at least one of a software defined topology (SDT) controller, a software defined protocol (SDP) controller, or a software defined resource allocation (SDRA) controller;
the modification of the performance checkpoint configuration comprises at least one of a modification of a performance checkpoint location, a deletion of a performance checkpoint, or an instantiation of a performance checkpoint;
the modification of the VNF configuration comprises at least one of a modification of a VNF location, a deactivation of a VNF instance, a deletion of a VNF instance, an activation of a VNF instance, or an instantiation of a VNF instance;
the modification of the protocol configuration comprises at least one of a modification of a protocol definition, a deactivation of a protocol instance, a deletion of a protocol instance, an activation of a protocol instance, an instantiation of a protocol instance, or a reordering of protocol execution;
the modification of the logical graph comprises at least one of a modification of a logical node location, a deletion of a logical node, an addition of a logical node, a modification of a traffic capacity of a logical node, a modification of a logical link location, a deletion of a logical link, or an addition of a logical link; and
a data plane of the virtual network comprises the plurality of logical nodes and the plurality of logical links.

20. The adaptation coordinator of claim 19, wherein a network service associated with the service-specific configuration comprises a machine-to-machine service.

21. The adaptation coordinator of claim 19, wherein the first controller comprises at least one of the processor or the non-transitory computer readable storage medium.

22. The adaptation coordinator of claim 18, wherein the modification of the resource allocation input comprises at least one of
a modification to prevent a flow allocation from exceeding a first capacity limit comprising one of a capacity limit of a first logical link of the plurality of logical links of the data plane, a capacity limit of a router, or a capacity limit of a physical link,
a modification to permit the flow allocation to avoid overloading the first logical link,
a modification to permit the flow allocation to avoid overloading the router,
a modification to permit the flow allocation to avoid overloading the physical link, or
a modification in a quantity of physical paths to be allocated for the first logical link.

23. The adaptation coordinator of claim 22, wherein the modification of the VNF configuration comprises at least one of a modification of adaptive packet aggregation of the first logical link, a modification of a traffic shaping configuration of the first logical link, or a modification of traffic prioritization of the first logical link.

24. The adaptation coordinator of claim 23, wherein:
the performance measurement indicates traffic congestion is present at an input queue of a router associated with the first logical link;
the modification of traffic prioritization comprises an increase in traffic prioritization of the first logical link; and
the modification of the protocol configuration comprises at least one of a reordering of protocol execution for the first logical link, a modification of a definition of a first protocol previously instantiated on the first logical link, an activation of the first protocol, a deactivation of the first protocol, or a deletion of the first protocol.

25. The adaptation coordinator of claim 23, wherein
the first capacity limit further comprises a safety margin for accommodating traffic variation, and
the modification of the protocol configuration comprises a reduction of a packet header size of the first logical link.

26. The adaptation coordinator of claim 23, wherein:
the performance measurement indicates traffic congestion is present at the first logical link and the traffic congestion is not present at an input queue of a router associated with the first logical link;
the modification of the traffic shaping configuration comprises at least one of an instantiation of a traffic shaping VNF to shape background traffic of the first logical link, or an activation of a traffic shaping VNF to shape background traffic of the first logical link; and
the modification in the quantity of physical paths comprises an increase in the quantity of physical paths to be allocated for the first logical link.

* * * * *